United States Patent [19]

Coates

[11] 4,245,313
[45] Jan. 13, 1981

[54] METHOD AND APPARATUS FOR DETERMINING CHARACTERISTICS OF SUBSURFACE EARTH FORMATIONS

[75] Inventor: George R. Coates, Houston, Tex.

[73] Assignee: Schlumberger Technology Corporation, New York, N.Y.

[21] Appl. No.: 412,908

[22] Filed: Nov. 5, 1973

[30] Foreign Application Priority Data

May 1, 1973 [GB] United Kingdom ............... 20611/73

[51] Int. Cl.$^3$ .................... G01V 3/28; G06F 15/00
[52] U.S. Cl. ..................................... 364/422; 73/152; 324/303; 324/370
[58] Field of Search ........................ 235/151.3, 151.35; 73/151, 152; 324/0.5 G, 1; 340/15.5 BA, 18 R; 364/421, 422

[56] References Cited

U.S. PATENT DOCUMENTS

| | | | |
|---|---|---|---|
| 3,180,141 | 4/1965 | Alger | 73/152 |
| 3,397,356 | 8/1968 | Dumanoir | 324/1 |
| 3,508,438 | 4/1970 | Alger et al. | 324/0.5 G X |
| 3,590,228 | 6/1971 | Burke | 235/151.35 |
| 3,638,484 | 2/1972 | Tixier | 73/152 |
| 3,721,960 | 3/1973 | Tinch et al. | 324/1 X |

*Primary Examiner*—Jerry Smith
*Attorney, Agent, or Firm*—Amster, Rothstein & Engelberg

[57] ABSTRACT

In accordance with illustrative embodiments of the present invention, measurements of a plurality of earth formation parameters are combined to produce a new parameter representative of characteristics of the formation. This new parameter is then utilized to determine the permeability of the formation.

16 Claims, 16 Drawing Figures

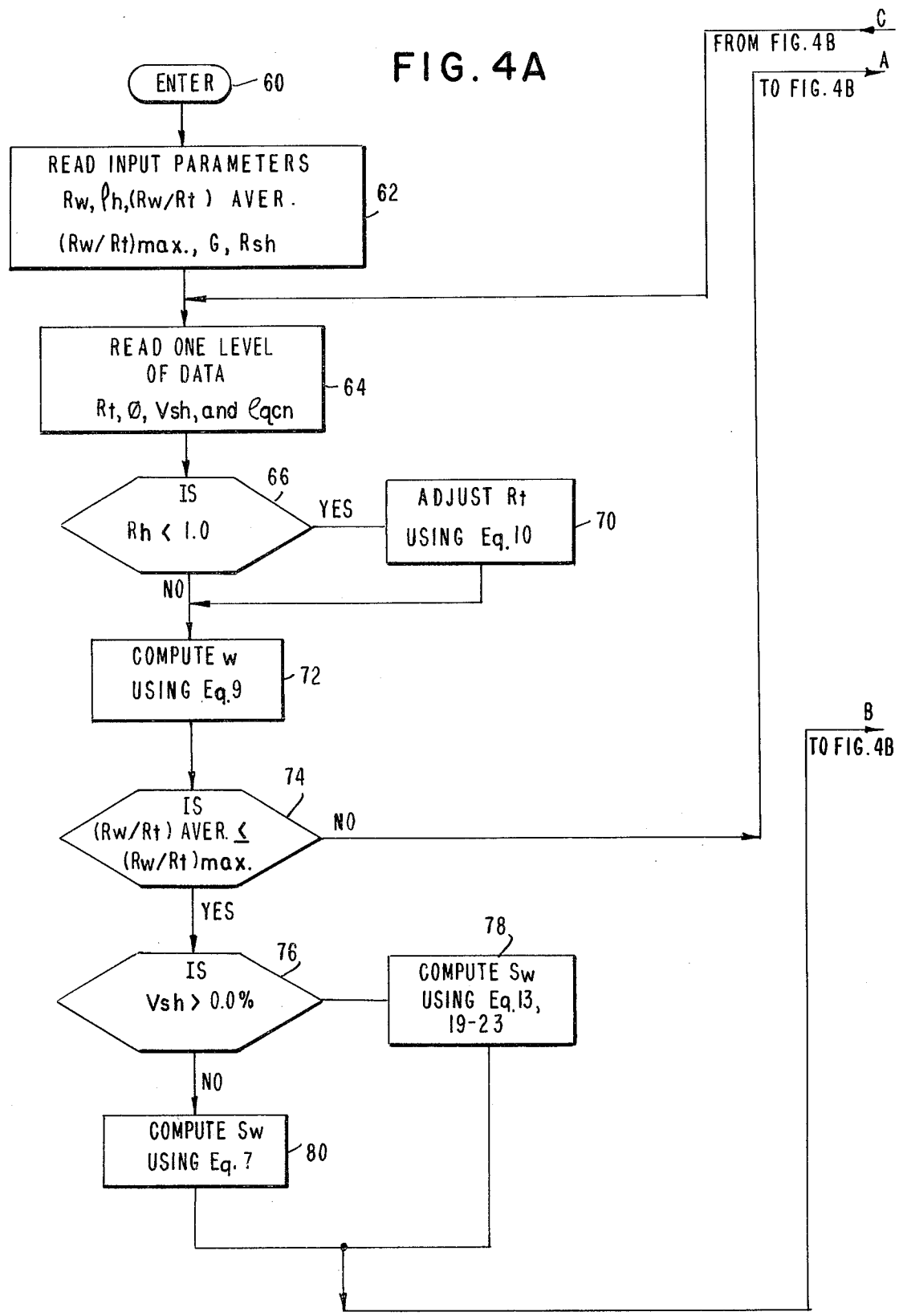

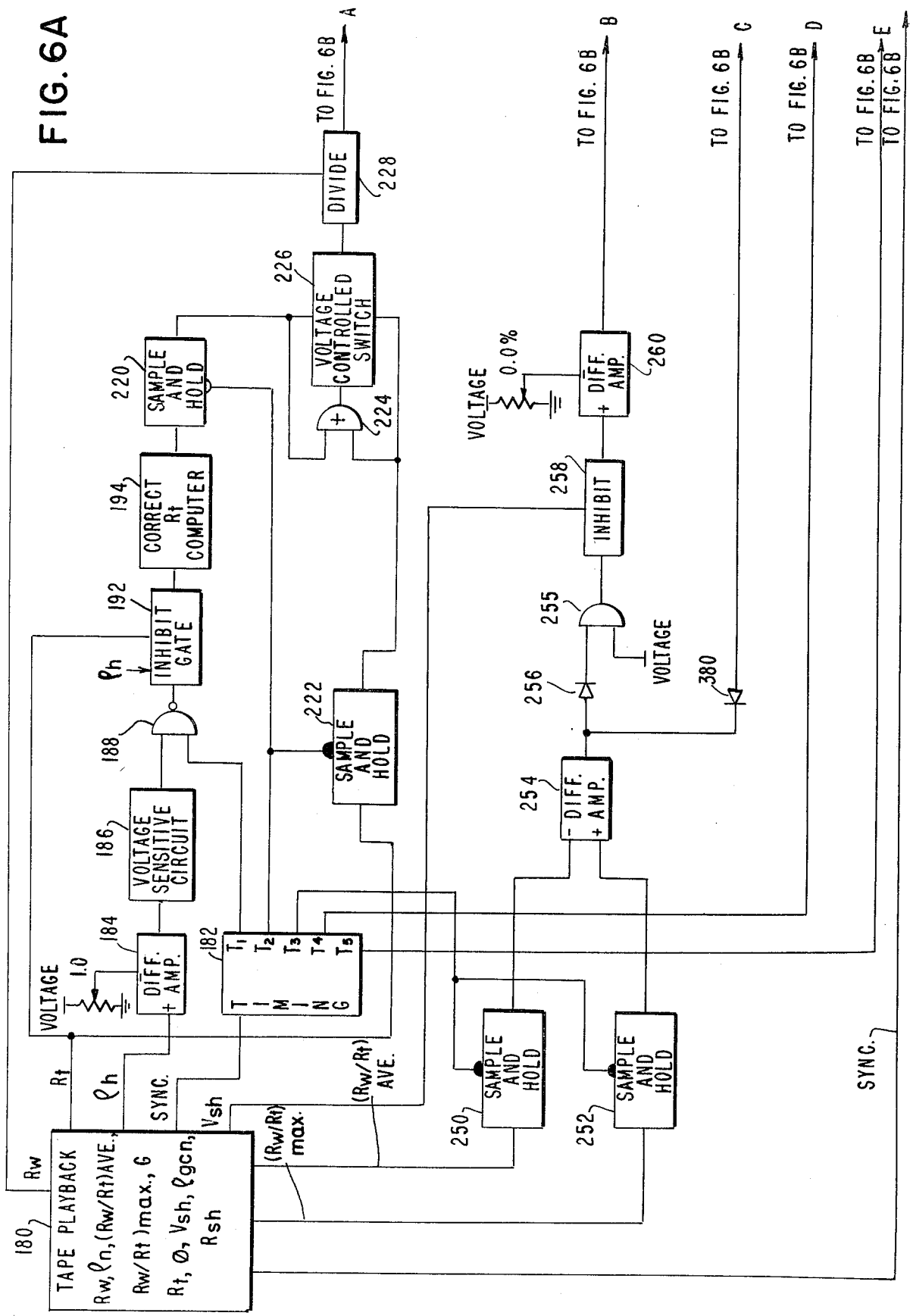

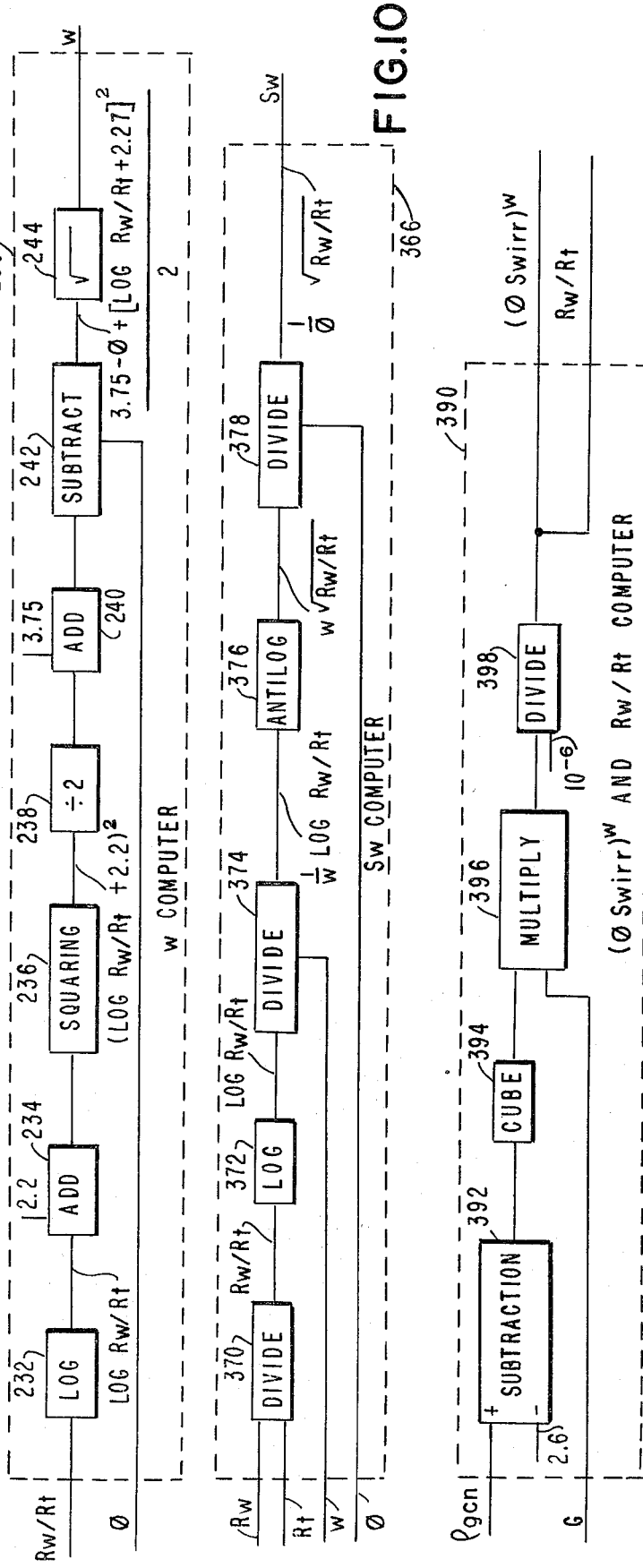

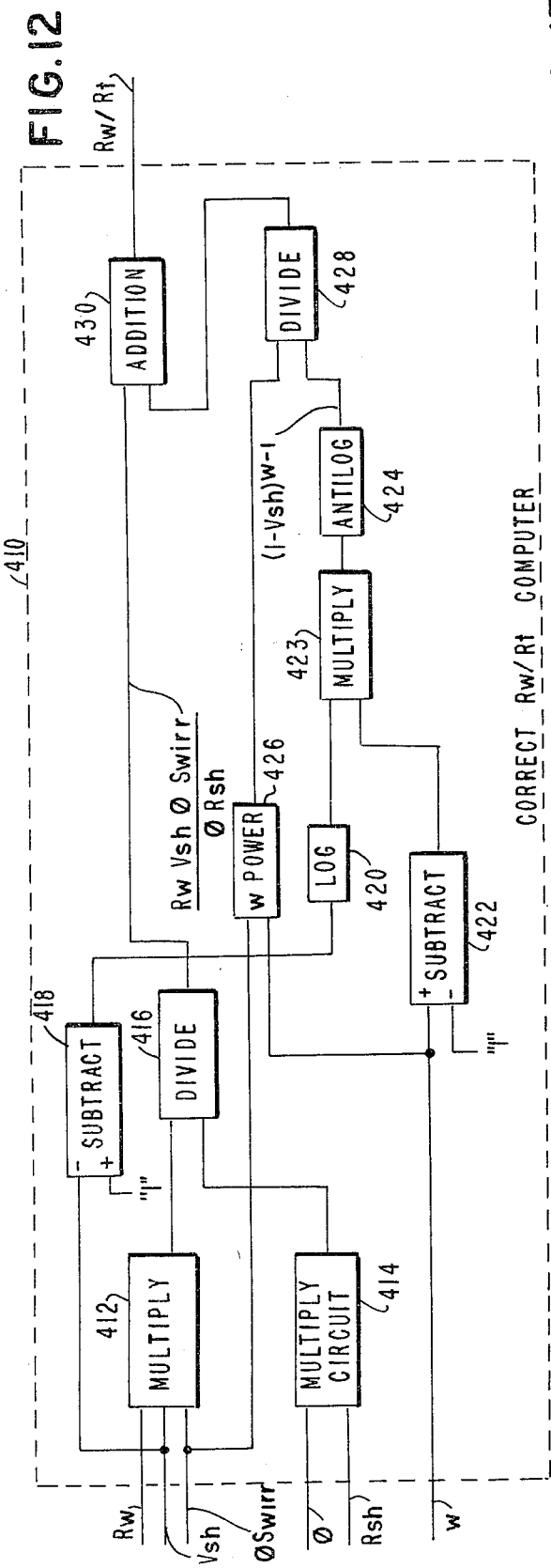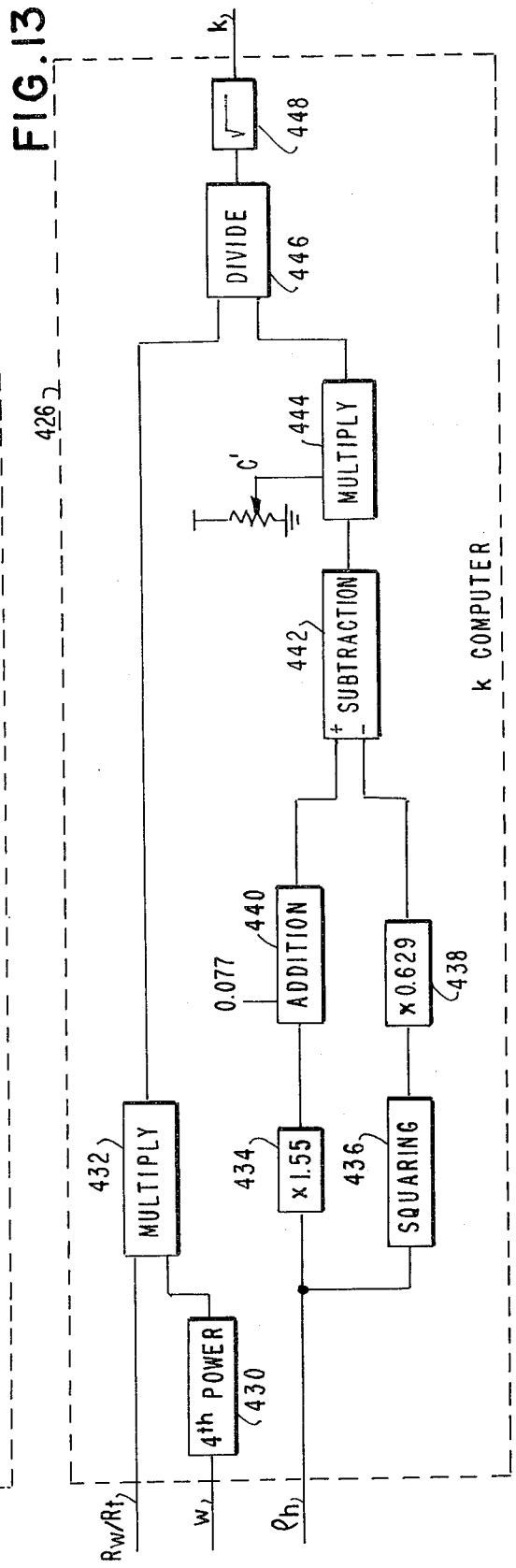

METHOD AND APPARATUS FOR DETERMINING CHARACTERISTICS OF SUBSURFACE EARTH FORMATIONS

BACKGROUND OF THE INVENTION

Due to the excessive costs of oil well exploration, it is of utmost importance to know if a particular formation penetrated by a wellbore contains producible hydrocarbons. As will be appreciated by those skilled in the art, hydrocarbon saturation of a formation may readily be determined from the water saturation of the formation. Saturation as used herein is defined as the total fluid content of the formation, and water saturation, hereinafter referred to as $S_w$, is that percentage of the total fluid content which is water. It will also be recognized by those skilled in the art, that hydrocarbon saturation, or $S_{HY}$, is equal to $1 - S_w$. Thus, it can be seen that once $S_w$ has been determined, $S_{HY}$ is readily obtainable.

There are at present many log evaluation and interpretation techniques for determining water saturation. These interpretation techniques are based on empirical relationships dependent upon a knowledge of porosity, $\phi$, resistivity of clean formations ($R_t$) and resistivity of connate water ($R_w$). For example, two well-known empirical relationships are employed. The relationship $$F = a/\phi^m \tag{1}$$

relates porosity ($\phi$) to the formation factor (F), and the relationship $$S_w{}^n = (F R_w/R_t) \tag{2}$$

relates the formation factor (F) and resistivities ($R_w$ and $R_t$) to the water saturation ($S_w$). The formation factor, F, is known to vary with the resistivity of a clean formation and with the resistivity of a brine formation which is fully saturated and $\phi$, the porosity, is the fraction of the total volume of subsurface material occupied by pores or voids. The cementation factor "m", saturation exponent "n" and the coefficient "a" will be discussed hereinafter.

The parameters $R_t$ and porosity, $\phi$, may be determined directly from well-logging measurements. For example, $R_t$ is obtained from such well-logging operations as induction logging, and $\phi$ is obtained from such operations as borehole compensated sonic logs, formation density compensated logs, and other compensation porosity logs or combinations of these logs. A discussion of these different logs is available in "Log Interpretation Principles", published by Schlumberger Limited, 277 Park Avenue, New York, N.Y. (1972). $R_w$ (water resistivity) on the other hand, must be determined by empirical relationships from various direct logging measurements. Typical relationships include those discussed in a publication entitled "Log Analysis of Sand-Shale sequences—A systematic Approach;" by Poupon et al, published in the July 1970 issue of the Journal of Petroleum Technology.

In practice, the values of "a" (formation factor coefficient) and "m" (cementation factor) in equation 1, and "n" (saturation exponent) in equation 2, vary with the type of formation and heretofore have been applied as fixed values which were determined empirically for various lithology types. A correct choice of the proper value of these parameters is often difficult, especially in complex lithologies. Therefore, since the accuracy of $S_w$ is dependent upon these parameters, it is highly desirable to develop a new relationship for more accurately determining these parameters in all formations.

Several different equations and techniques are also presently used for determining permeability, K, of a formation from well-logging data. However, none of these techniques is universally applicable from field-to-field, well-to-well, or even zone-to-zone within a well, without making adjustments to constants or exponents, or other compensations. There are two relationships which are most often utilized for determining permeability, one is $$K^{\frac{1}{2}} = C \frac{\phi^m}{S_{wirr}^n} \tag{3}$$

This equation is based on empirical studies which found the permeability of certain formations to be relatable to the ratio of $\phi$ to $S_{wirr}$ through the use of a coefficient "C" and the exponents m and n. The coefficient "C" was generally found to be related to hydrocarbon type while the exponents m and n were found to apply to the type of lithology.

Another equation:

$$K^{\frac{1}{2}} = 100 \frac{\phi^{2.25}}{S_{wirr}} \tag{4}$$

is a modified form of an equation developed by A. Timur (see "An Investigation Of Permeability, Porosity And Residual Water Saturation Relationships For Sandstone Reservoirs" by A. Timur, the *log analyst*, Volume 9, No. 4, July-August, 1968) which is simply an adaptation of equation 3 for the specific condition of a relatively clean, consolidated sandstone formation of medium porosity. Since "m" and "n" are lithology dependent, any attempt to fix them at constant values automatically induces errors when applied in non-standard conditions. This is particularly apparent when these relationships are used for fine-grained or shaly formations. Such applications demonstrate the need for developing a more accurate technique for obtaining the permeability of a formation.

In accordance with this invention, relationships between the parameters for determining both water saturation and permeability are established and used to obtain more accurate representations of each of these formation parameters.

SUMMARY OF THE INVENTION

In accordance with the invention, well-logging measurements are derived and combined in a new and useful way to produce a parameter functionally related to the formation porosity and the ratio of the water resistivity to the formation resistivity. This parameter is combined with other well-logging measurements to provide parameters representative of the formation water saturation and the permeability of the formation. The invention is carried out using an appropriately programmed general purpose computer or an analog computer.

BRIEF DESCRIPTION OF THE DRAWINGS

FIGS. 3, 4A and 4B are diagramatic representations of a computer program flow chart for carrying out the invention utilizing a general purpose digital computer;

FIGS. 5-13 are diagramatic representations of a special purpose analog computer for practicing the invention.

DESCRIPTION OF THE PREFERRED EMBODIMENT

Figure 1:
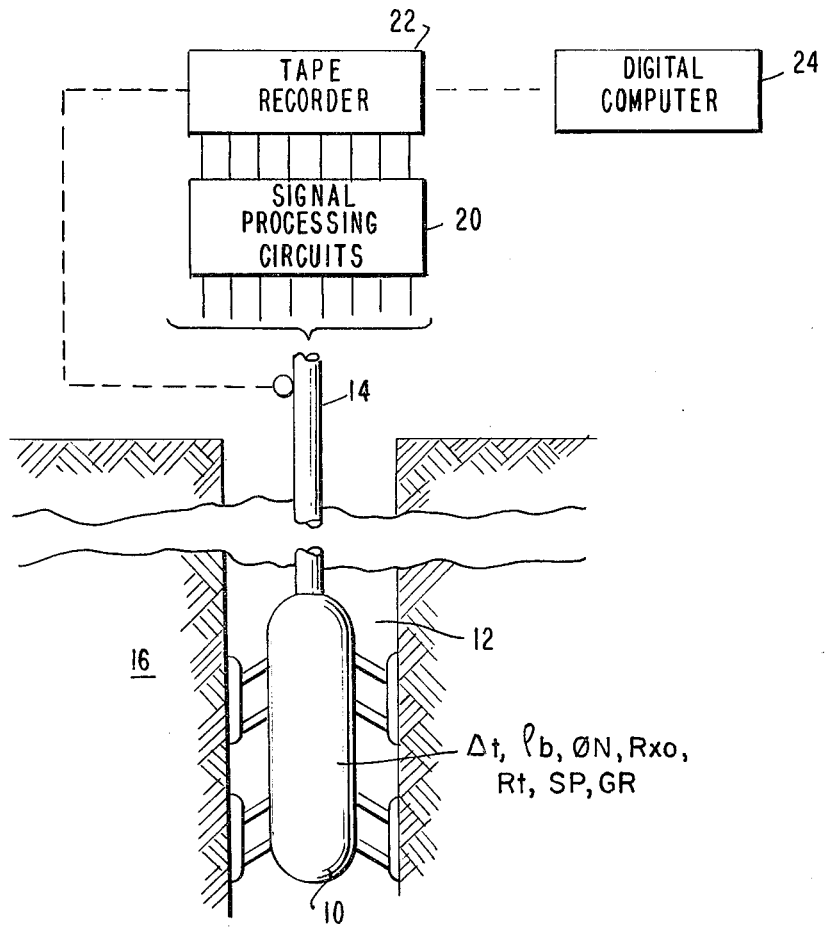
FIG. 1 shows an investigating apparatus suspended in a borehole for deriving a plurality of well-logging measurements and a schematic representation of apparatus for processing these well-logging measurements.

Referring to FIG. 1, there is shown an investigating apparatus 10 located in a borehole 12 on the end of a multiconductor cable, 14 which is raised and lowered in borehole 12 drilled into the earth formation 16 by a suitable winch mechanism (not shown). Investigating apparatus 10 includes exploring devices for obtaining measurements of the acoustic travel time $\Delta t$, bulk density $\rho_b$, deep and shallow resistivity, $R_t$ and $R_{xo}$, spontaneous potential SP, and porosity, $\phi_n$, derived from a neutron exploring device and the natural gamma ray count, GR, of the formation.

Measurement signals derived from the exploring device 10 are transmitted to the suitable signal processing circuits 20 at the surface of the earth. The signal processing circuits convert the well-logging signals into digital form for temporary storage by way of a digital tape recorder 22 or for application to a computer 24 which is programmed in accordance with the teachings of the present invention to process the data in a manner to provide valuable information relative to the nature of the earth formation. It should be appreciated at this point that the digital computer could either be a truck-mounted computer for operation at the well site, or the data could be transmitted via a telephone communication or other technique to a computer located some distance away. If the data was recorded on a magnetic tape by way of a tape recorder, the tape containing the data could be simply directly transported to the distant computer for processing. While the measurements to be used in practicing the present invention are shown in FIG. 1 as having been derived from one exploring device, it should also be understood that these measurements could be derived from a plurality of exploring devices which are run through the borehole at different times. In this event, the data from each run would be recorded on individual magnetic tapes and the total data would then be merged for use by digital computer 24. Such merging may preferably be accomplished by merging all the data on a single tape for processing by the digital computer. Alternatively, the data could be processed using a special purpose analog computer.

An acoustic exploring device for deriving a measurement for $\Delta t$ can be found in U.S. Pat. No. 3,231,041 granted to F. P. Kokesh on Jan. 25, 1966. An exploring device for obtaining the measure of the bulk density can be found in U.S. Pat. No. 3,321,625 granted May 23, 1967 to John F. Wahl. An exploring device for obtaining resistivity measurements and measurements of the spontaneous potential of the earth formation can be found in U.S. Pat. No. 3,053,530 granted to G. Attali on July 1, 1969. An example of an exploring device for obtaining a neutron porosity log measurement can be found in U.S. Pat. No. 2,769,918 granted to C. W. Tittle on Nov. 6, 1956.

Returning to the discussion of the cementation factor (m), the saturation exponent (n) and the coefficient (a), it is believed by many experts in the field that the coefficient "a" in equation (1) can be assumed to be equal to one (1) since the formation factor (F), must be equal to one (1) in formations having 100% porosity. Using these assumptions, equation (1) can be written as:

$$F = 1/\phi m \qquad (5).$$

It will also be appreciated by those skilled in the art that the product $\phi S_{wirr}$ (porosity times irreducible water saturation) as derived from certain wellbore measurements, tends to be constant in a given formation (see "Using Log-Derived Values of Porosity and Water Saturation," by Morris et al, published in the Transactions of the SPWLA, 7th annual loggings symposium, June 11-14, 1967). The value of this product ($\phi S_{wirr}$) depends on several factors or combinations of factors, including the lithology of the formation. A correlation between the value of this product and the sub-surface lithology is shown in Table I.

TABLE I
Rock Classifications

CLASS I: Dense limestone, dolomite, some conglomerates, and quartzites—the matrix is characterized as being very fine-grained with a low matrix porosity (less than 5%). m ranges from 2.2 to 2.5. The product, ($\phi S_{wirr}$), is approximately 0.01.

CLASS II: Tripolitic or chalky limestone, also shaly or very fine-grained sandstone. Matrix porosity is rather high, and permeability low. m is generally taken as 2. ($\phi S_{wirr}$) is approximately equal to 0.1.

CLASS III: Granular limestone, sandstone, dolomites, coarse to fine-grained, fair to good permeability. The formula generally used is $F = 0.62/\phi 2.15$. ($\phi S_{wirr}$) is approximately equal to 0.025.

The Table I is representative of work discussed in detail in the publications: "Classification of Reservoir Rocks and Petrophysical Considerations," by G. R. Archie, AAPG Bulletin, Volume 36, No. 2, (February 1952) and "Logging Trends and Carbonate Rocks", by R. P. Alger, published in the Mines Magazine, October 1957. While this Table has provided some useful information regarding the classification of rocks, it has not provided a solution to the problem, since lithology classifications are not sharply separated by exact boundaries, and the influence of other variables, such as degree of cementation, lack of compaction or the type of hydrocarbon present, will cause variations in the value of ($\phi S_{wirr}$) for a particular lithology.

It has been found that the most accurate determination of $S_{wirr}$ conditions utilizing the ($\phi S_w$) technique are obtained in formations which are at irreducible water saturation, are reasonably homogeneous, have a constant hydrocarbon type, consist primarily of intergranular porosity, and are originally water-wet (i.e., the formation originally contained water). Deviations from these conditions will produce inaccuracies in this determination which is primarily related to variations in $S_{wirr}$ which, for practical purposes, is the saturation at which a reservoir will produce hydrocarbons without water being present therein. Of course, water saturation is truly irreducible only when the water left in place is that which is immovable because it is either bound to the surface of the grains or is trapped by surface tension at the contact point of the grains. Physically, this volume of irreducible water is dependent on rock properties (pore geometry, type of rock, degree of cementation, size of the grain), the interfacial tension between the hydrocarbon and water, the wettability of the rock, and the capillary pressure.

Values for these last named parameters are generally not known to the log analyst. However, the matrix density, hydrocarbon density, and rock type which are related to these unknown parameters, are available. After a great deal of experimentation and investigation, it has been determined that for the condition of irreducible water saturation, equations 2 and 5 may be combined as follows:

$$\phi^m (S_{wirr})^n = R_w/R_{tirr} \qquad (6)$$

Since the product of $\phi S_{wirr}$ tends to be constant, it will be appreciated that the ratio, $R_w/R_{tirr}$ may also be constant and that m and n may be assumed to be equal. Table 2 shows a number of actual laboratory measurements on various formations having different lithologies and the average values for m and n determined for these formations.

TABLE II

| Formation Present | Lithology | Ave m | Ave n |
|---|---|---|---|
| Reservoir 1 | Sandstone | 1.9 | 1.8 |
| Reservoir 2 | Sandstone | 1.9 | 1.6 |
| Reservoir 3 | Sandstone | 1.8 | 2.1 |
| Reservoir 4 | Sandstone | 1.7 | 1.9 |
| Reservoir 5 | Sandstone | 1.8 | 1.8 |
| Reservoir 6 | Consolidated Sandstone | 1.95 | 2.1 |
|  | Unconsolidated Sandstone | 1.6 | 2.1 |
| Reservoir 7 | Hard Sandstone | 1.8 | 1.7 |
| Reservoir 8 | Limestone | 2.0 | 1.6 |
| Reservoir 9 | Limestone | 2.0 | 2.8 |
| Reservoir 10 | Sandstone | 2.0 | 2.5 |
| Reservoir 11 | Chalk | 2.0 | 1.5 |
| Reservoir 12 | Sandstone | 1.9 | 1.3 |
| Reservoir 13 | Limestone and Dolomite | 2.0 | 3.8 |
| Reservoir 14 | Sandstone | 1.6 | 1.6 |
| Reservoir 15 | Limestone | 1.9 | 1.8 |
| Reservoir 16 | Sandstone | 1.8 | 1.9 |
| Reservoir 17 | Sandstone | 1.75 | 1.3 |
| Reservoir 18 | Sandstone | 1.8 | 1.8 |
| Reservoir 19 | Sandstone | 2.0 | 1.9 |
| Reservoir 20 | Limestone | 1.9 | 2.0 |
| Reservoir 21 | Sandstone | 1.8 | 1.9 |
| Reservoir 22 | Sandstone | 1.8 | 2.0 |
| Reservoir 23 | Limestone | 1.9 | 1.7 |
| Reservoir 24 | Sandstone | 1.7 | 2.0 |
| Reservoir 25 | Sandstone | 1.6 | 1.6 |
| Reservoir 26 | Sandstone | 2.0 | 1.6 |
| Reservoir 27 | Sandstone | 1.55–1.94 | 1.73–2.22 |
| Reservoir 28 | Sandstone | 1.71 | 1.66 |
| Reservoir 29 | Sandstone | 1.82 | 1.47–1.52 |
| Reservoir 30 | Sandstone | 1.80–1.87 | 1.64–1.69 |
| Reservoir 31 | Sandstone | 2.01 | 1.66 |
| Reservoir 32 | Sandstone | 1.89 | 1.49 |
| Reservoir 33 | Limestone | 1.94–2.02 | 2.04–2.08 |
| Reservoir 34 | Limestone | 1.77 | 1.15 |
| Reservoir 35 | Sandstone | 1.52 | 1.28 |

Although there are distinct cases illustrated in Table II which show "m" and "n" to be different from one another, in most cases they have nearly the same values. Therefore, since the measurements where "m" and "n" are approximately equal are representative of the more typical situation, "m" and "n" are assumed equal and are hereinafter referred to as a new parameter, w (i.e., m=n=w). On this basis, equation 6 can be rewritten as:

$$(\phi S_{wirr})^w = R_w/R_{tirr} \qquad (7)$$

And in solving for w, the following equation is obtained:

$$w = \frac{\log (R_w/R_{tirr})}{\log (\phi S_{wirr})} \qquad (8)$$

For log analysis use however, equation 8 is inconvenient since in order to determine w, the value $S_{wirr}$ must be known in advance. To overcome this problem, the following relationship, relating w to parameters already available in log analysis has been developed:

$$w^2 = 3.75 - \phi + \frac{[\log (R_w/R_{tirr}) + 2.2]^2}{2} \qquad (9)$$

When equation 9 is plotted with w as a function of $R_w/R_t$ for constant values of $\phi$, it has been found that w reaches a minimal value when $R_w/R_t$ is approximately equal to 0.006 and increases in either direction from this value. The minimum value of w has in turn been found to be associated with the class III type formations described in Table I and typifies the better oil and gas producing reservoirs. With reference to Table I, an increase in w when $R_w/R_t$ decreases has been found to be indicative of an increase in the cementation, or in the extreme case, a change to a Class I type lithology. An increase in w when $R_w/R_t$ increases has been found to be indicative primarily of an increase in the volume of irreducible water which is normally associated with a decrease in grain size. This is also associated with a change from the original Class III lithology to a Class II lithology.

Equation 9 was derived based on the assumption that the reservoir contained only oil; that is, no gas. However, reservoirs are, of course, encountered which do contain other hydrocarbons, such as gas. $S_{wirr}$ is known to vary with the type of hydrocarbon present in the formation, and therefore $R_{tirr}$ varies. To permit a uniform computation of w which takes into account the type of hydrocarbon present in the formation, requires an adjustment to the $R_t$ value of equation 9. This allows a uniform computation of w which is independent of the hydrocarbon type. Present results indicate that an adjustment which is a function of hydrocarbon density provides a reasonable result with normal reservoir conditions of pressure and temperature. The adjusted value of $R_t$, $R_{tadj}$ is obtained as:

$$R_{tadj}/R_{tlog} = 0.077 + 1.55\rho_h - 0.627\rho_h^2 \qquad (10)$$

In addition for the need for correction for the effects of light hydrocarbons such as gas, it will be appreciated that all formations are not in an irreducible state and that the results must be corrected if the formation is not at an irreducible state. A procedure for determining if a formation is at irreducible saturation is summarized as follows:

a. Determine the average and minimum values of $R_w/R_t$ over the reservoir using log readings (typically samples every six inches from a magnetic tape recording).

b. Determine from Table III below, the value of the multiplier corresponding to $(R_w/R_t)$ min. This multiplier indicates the spread of $R_w/R_t$ values tolerated if the reservoir is to be considered at irreducible saturation.

TABLE III

| $(R_w/R_t)_{min}$ | MULTIPLIER | $(R_w/R_t)_{min}$ | MULTIPLIER |
|---|---|---|---|
| >0.03 | 1.1 | 0.003 to 0.007 | 3.0 |
| 0.02 to 0.03 | 1.3 | 0.001 to 0.003 | 3.5 |
| 0.012 to 0.02 | 1.75 | 0.0001 to 0.001 | 4.0 |
| 0.007 to 0.012 | 2.5 | <0.0001 | 6.0 | c. Multiply $(R_w/R_t)_{min}$ by the multiplier to find $(R_w/R_t)_{max}$.

d. Determine if the average value of $R_w/R_t$ is less than or equal to the maximum value of $R_w/R_t$, $(R_w/R_t)_{ave} \leq (R_w/R_t)_{max}$. if this is so, then the zone is considered to be at irreducible saturation.

It should be noted, however, that if the reservoir is heterogeneous, it may fail this test and still be at irreducible water saturation. Knowledge of reservoir conditions is therefore helpful in determining this possibility. If a formation is not at irreducible water saturation, the assumed value of $R_t$ from the log is less than the value of $R_{tirr}$ and consequently the value of w computed from equation 9 will be in error.

Figure 2:
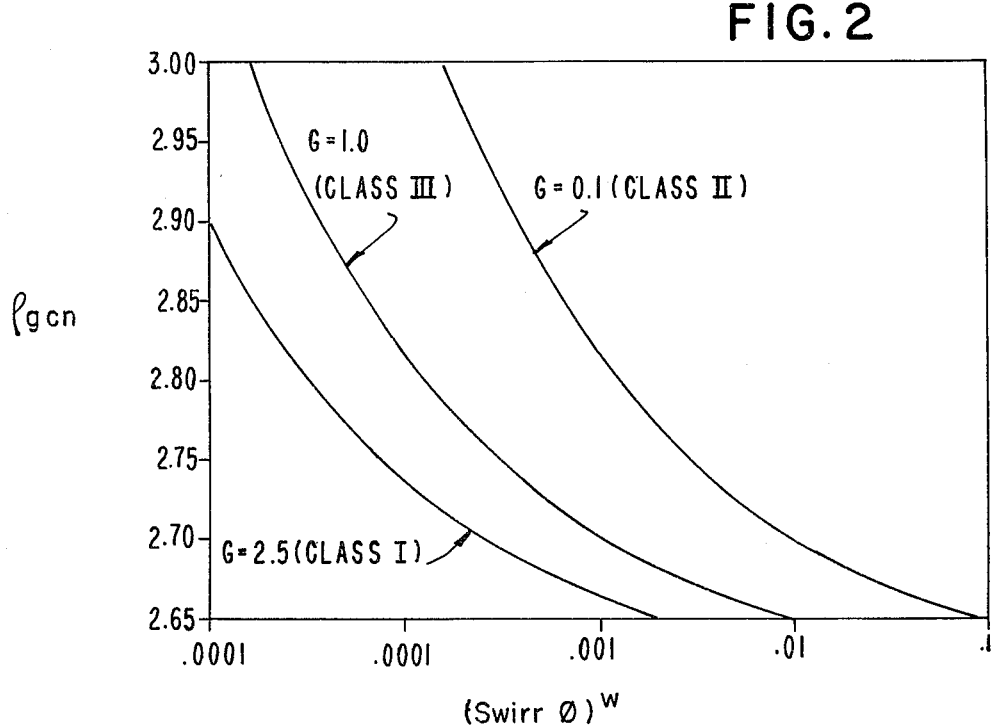
FIG. 2 is a crossplot of $\rho_g$ (clean matrix density) versus $(S_{wirr}\phi)^w$.

To correct for this possibility, the following relationships have been established between the clean matrix density ($\rho_{gcn}$), classification of lithology as shown in Table I and $R_{tirr}$:

$$(R_w/R_{tirr}) = (\phi S_{wirr})^w = \frac{10^{-6}}{G(\rho_{gcn} - 2.6)^3} \quad (11)$$

Where G is a coefficient involving the matrix classification, and the subscript, cn, denotes a clean formation. A G value of 1.0 fits most Class III formations (See Table I); however, in Class II formations a G value of 0.1 or less may be required. Also, in Class I formations, a value greater than 1.0 may be needed. This relationship is illustrated in FIG. 2 wherein curves 1, 2 and 3 are representative of G values of 2.5, 1.0 and 0.1, respectively.

When the formation is not at irreducible water saturation, the corrected value of $(R_w/R_t)_{cn}$ derived from equation 11 for a clean formation is used in place of $R_w/R_t$ in equation 9 to determine w. The value of G to be used in equation 11 can be determined from similar reservoirs which are at irreducible water saturation. However, if no formations are at irreducible water saturation, or they do not exhibit similar lithological characteristics, then it is necessary to known the general classification of the matrix (see Table I) to determine a reasonable value of G by way of FIG. 2.

Further complications arise when the formation contains shale, and in these cases correction for $R_t$ is also necessary. A technique similar to that employed in clean formations is used with an additional step necessary to correct the results of equation 11 for shaliness. This is accomplished through the following equation:

$$R_w/R_{tirr} = \frac{R_w V_{sh}}{\phi R_{sh}} (\phi S_{wirr}) + \frac{(\phi S_{wirr})^w}{(1 - V_{sh})^{w-1}} \quad (12)$$

Equation 12 is derived from the modified shaly-sand water saturation equation:

$$\frac{1}{R_t} = \frac{V_{sh} S_w}{R_{sh}} + \frac{(\phi_{sd} S_w)^w}{R_w} (1 - V_{sh}) \quad (13)$$

where: $\phi_{sd} = \frac{\phi_e}{1 - V_{sh}}$ is the porosity of the sand portion of the formation (pore space divided by total of sand matrix volume plus pore space) and $V_{sh}$ is the shale content of the formation and $R_{sh}$ is the shale resistivity. Determination of accurate values of $V_{sh}$ may be accomplished by using the techniques described and explained in the above-referenced Poupon et al publication. $S_w$ is computed using the following iterative approach:

As a first assumption, equation 12 is rewritten in the following quadratic form:

$$\frac{1}{R_t} = \frac{V_{sh} S_w}{R_{sh}} + \frac{\phi^w S_w^2}{R_w (1 - V_{sh})^{w-1}} \quad (19)$$

and the quadratic equation solved for $S_w$ with:

$$A = \frac{\phi^w}{R_w(1 - V_{sh})^{w-1}} \quad (20)$$

$$B = V_{sh}/R_{sh} \quad (21)$$

$$C = -1/R_t \quad (22)$$

as the quadratic factors. It has been found that this solution provides reasonably accurate values for $S_w$ if $V_{sh}$ is less than 50%. However, to obtain more accurate values of $S_w$ under all conditions of shale content in the formation, the value of $S_w$ is more accurately computed using an iterative process. To that end, a new value of $S_w$ is computed using the following expression:

$$S_w = C + A \left[ \frac{2S_{w1} - S_{w1}^w}{B + 2AS_{w1}} \right] \quad (23)$$

Where: A, B and C are found from equations 20–22 and $S_{w1}$ is a previously computed value for $S_w$, either using equation 19 as the first computed value or subsequently through the use of equation 23. If the value of $S_{w1}$ and the value of $S_w$ computed using equation 23 differ by less than 0.005, the original value of $S_w$ ($S_{w1}$) is used. If not, the new value of $S_w$ computed using equation 23 is used to compute still another value of $S_w$ using equation 23. This continues until the two values of $S_w$ differ by less than 0.005.

It will be appreciated that by utilizing the new variable—"w" which is lithology dependent a new relationship for determining formation permeability can be derived. By substituting the exponent w for both the exponents m and n in equation 3, permeability can be computed according to:

$$K^{\frac{1}{2}} = C \left( \frac{\phi}{S_{wirr}} \right)^w \quad (14)$$

Tests indicate that the resulting correlation to known core permeabilities are generally good; however, there were some inaccuracies in the computed values of permeability using equation 14. Upon further investigation and analysis, it was found that the relationship:

$$K^{\frac{1}{2}} = \frac{C}{W^4}\left(\frac{\phi}{S_{wirr}}\right)^w \quad (15)$$

gives the most accurate results. By combining equation 6 and equation 15, $S_{wirr}$ may be eliminated and the following equation obtained:

$$K^{\frac{1}{2}} = \frac{C}{W^4}\left(\frac{\phi^{2w}}{R_w/R_{tirr}}\right) \quad (16)$$

Although equations 15 and 16 provide values which correlate significantly with core analysis permeabilities, the absolute values of the computed values of k vary, particularly in going from oil to gas formations, indicating that adjustment for hydrocarbon type is needed. Studies of the values of C needed in equation 15 to match the values of permeability from core analysis with those from log result in the following relationship:

$$C = 23 + 465\rho_h - 188\rho_h^2 \quad (17)$$

Combining equation 17 with equation 16 results in the following equation for permeability:

$$K^{\frac{1}{2}} = \frac{C'(0.077 + 1.552\,\rho_h - 0.629\,\rho_h^2)}{W^4(R_w/R_{tirr})} \quad (18)$$

where C' has a constant value of 300. This equation has been found to provide relatively accurate results in a wide variety of lithologies as long as the basic conditions of irreducible saturation and granular structure are met. If the formation is not at irreducible water saturation, appropriate adjustments to the log values must be made using equations 11 and 12 as described above, since the adjusted value of $R_w/R_t$ is used in equation 18. Thus, a relatively accurate determination of permeability is possible in non-irreducible conditions if an appropriate value of G has been selected to suit the rock type and the formation.

A remaining difficulty is the determination of permeability in zones exhibiting non-granular porosity, such as fracturing or vuggy conditions. This is a more difficult problem, since the formations exhibit many similarities on logs, and yet fractures often have high permeabilities while vuggy formations often do not. Recognition of these conditions is required prior to establishing a permeability relationship. This is best accomplished by employing a comparison of $S_{wirr}$ and $S_{xo}$ to detect indications of moved hydrocarbons. This information is then used to judge if any indicated fractures or vugs contribute to fluid movement.

The best solution to date in these reservoirs is to determine two values of permeability, one using $\phi_{total}$ and the other using $\phi_e$. These values then bracket the range of k which may be expected in a formation.

To summarize the computation procedure, the parameters, $R_w$, $\rho_h$ and G are determined for a formation interval of interest which may be extend for the entire length of the borehole. These parameters are found using techniques well-known to log analysts. From the values of $R_t$ for the formation interval which are determined from well-logging measurements, the average and minimum values of $R_w/R_t$, $(R_w/R_t)_{ave}$ and $(R_w/R_t)_{min}$ respectively, are determined. The value of $(R_w/R_t)_{min}$ is multiplied by a factor determined from Table III to determine $(R_w/R_t)_{max}$.

For each depth level, values for $R_t$, $V_{sh}$ and $\rho_{gcn}$ are determined from logging data and standard log interpretation techniques. If $\rho_h$ is less than 1.0, the value of $R_t$ is first adjusted using equation 10. Next, w is computed using equation 9. Then it is determined whether the formation interval is at a reducible water saturation by comparing $(R_w/R_t)_{ave}$ with $(R_w/R_t)_{max}$. If the formation is not at a reducible water saturation, i.e., $(R_w/R_t)_{ave}$ is not less than or equal to $(R_w/R_t)_{max}$, values for $(\phi S_{wirr})^2$ and $(R_w/R_t)$ are computed using equation 11, from which $\phi S_{wirr}$ is computed. If the formation contains shale, $V_{sh}$ exceeds 0.0%, $R_w/R_{tirr}$ requires correction using equation 12 and the value of $\phi S_{wirr}$ computed above, w is then recomputed using equation 9 and the value of $R_w/R_{tirr}$, and $S_w$ computed using equations 13 and 19–23. If the formation is not shaly, w is recomputed using equation 9 and the value of $R_w/R_{tirr}$ computed above and $S_w$ computed using equation 7.

Returning to the determination of whether the formation is at an irreducible water saturation, if $(R_w/R_t)_{ave}$ is equal to or less than $(R_w/R_t)_{max}$, indicating that the formation is at a reducible water saturation, it is next determined if the formation is shaly. If it is, $S_w$ is computed using equations 13 and 19–23 and if not, $S_w$ is computed using equation 7.

The value for permeability, K, can now be computed using equation 18 with the proper values of w. If the formation is at an irreducible water saturation, the value of $R_{tirr}$ is the value of $R_t$ derived from the log measurements, or if the formation is not at an irreducible water saturation, the corrected value of $R_w/R_{tirr}$ from equation 11 (or equation 13 if shaly) is used in equation 18.

Figure 3:
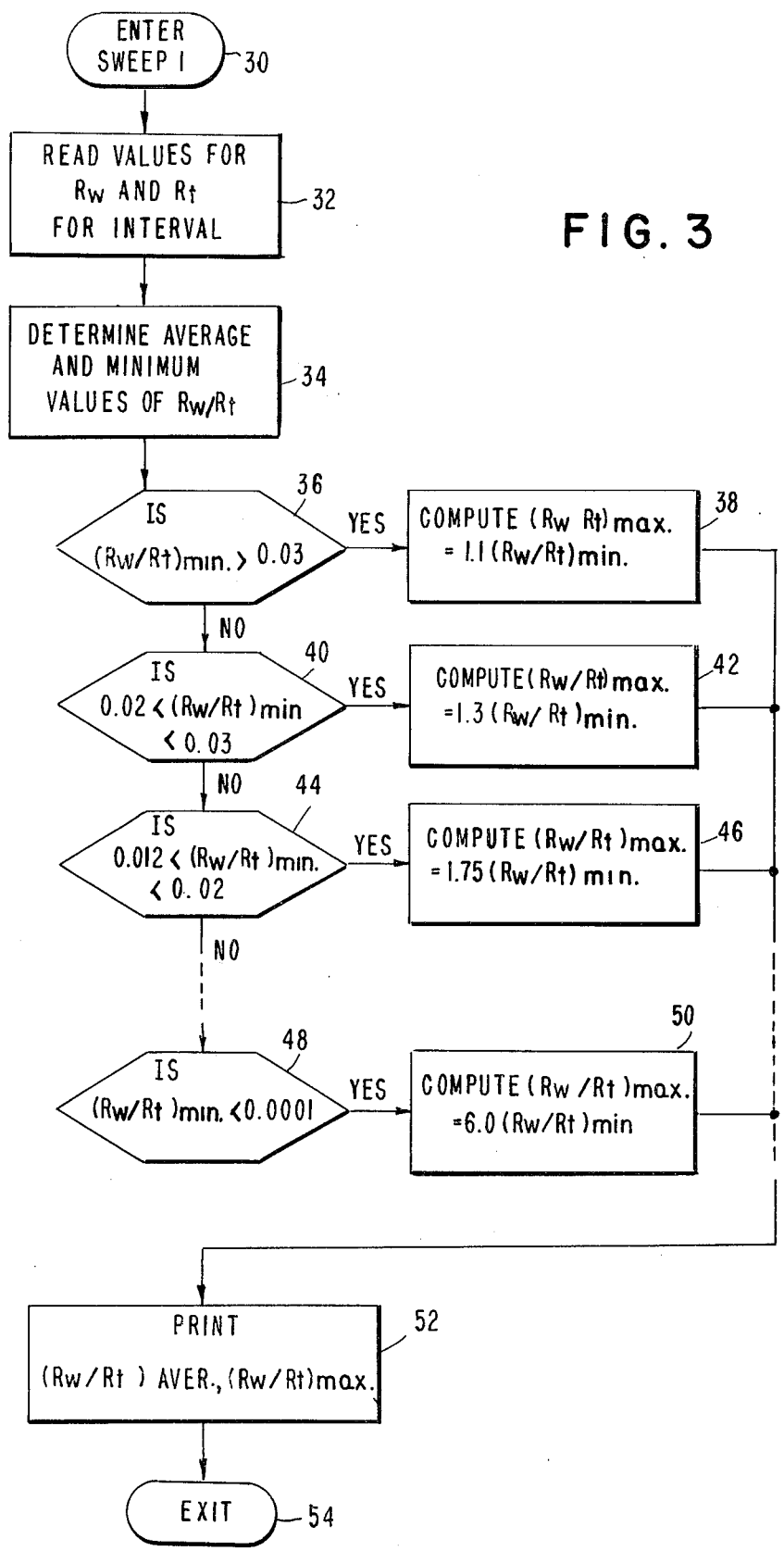
Figure 4B:
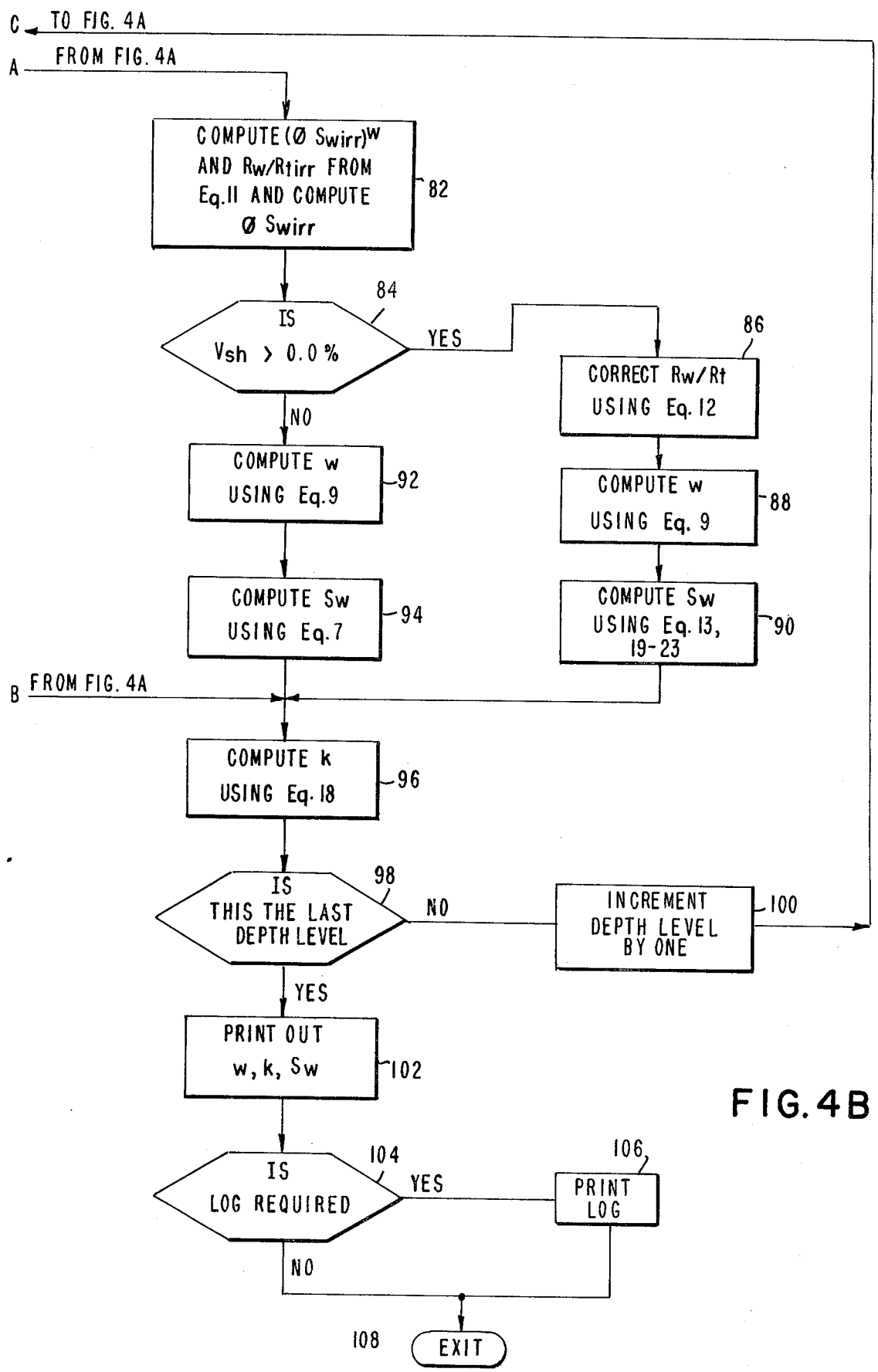

The computation just summarized can be carried out using an appropriately programmed general purpose computer or a special purpose analog computer. Referring to FIGS. 3 and 4, there is shown a flow diagram representation of a computer program for carrying out the invention on a digital computer. The program is run in two sweeps through the data. On the first sweep, the formation interval is analyzed to produce parameters which can be used to determine whether the formation is at an irreducible water saturation. During the second sweep of the data, the formation parameters are analyzed and the value for the permeability of the formation at selected depth levels is determined.

Referring now to FIG. 3, the first sweep is entered via block 30 and the values for $R_w$ and $R_t$ for the entire formation interval are read, block 32. The average and minimum value of $R_w/R_t$ are then determined, block 34, after which decision element 36 determines whether $(R_w/R_t)_{min}$ is greater than 0.03. If it is, YES answer, the value of $(R_w/R_t)_{max}$ equal to 1.1 $(R_w/R_t)_{min}$ is computed, block 38. If the answer is NO, decision element 40 determines if $(R_w/R_t)_{min}$ is between 0.02 and 0.03. If the answer is YES, $(R_w/R_t)_{max}$ is computed as equal to 1.3 $(R_w/R_t)_{min}$, block 42. If the answer from decision element 40 is NO, decision element 44 determines whether $(R_w/R_t)_{min}$ is between 0.012 and 0.02. If the answer is YES, $(R_w/R_t)_{max}$ is computed as 1.75 $(R_w/R_t)_{min}$, block 46. It should now be apparent that the purpose of this portion of the program is to determine in what range of values $(R_w/R_t)_{min}$ lies and once that range is determined, $(R_w/R_t)_{min}$ is multiplied by an appropriate factor, which is determined from Table III, to find $(R_w/R_t)_{max}$. Therefore, for the sake of brevity, the intermediate steps for classifying $(R_w R_t)_{min}$ have been omitted and are represented by the dotted lines in FIG. 3.

As a final step, if $(R_w/R_t)_{min}$ is determined less than 0.0001 by decision element 48, $(R_w/R_t)_{max}$ is computed as 6.0 $(R_w/R_t)_{min}$, block 50. As represented by block 52, the average and maximum values of $R_w/R_t$ are printed, block 52 and the sweep ends, block 54.

Referring to FIG. 4, the second sweep of the data is entered via block 60. Input parameters, $R_w$, $\rho_h$ and $R_{sh}$ for the formation interval, are read along with the values of $(R_w/R_t)_{ave}$, $(R_w/R_t)_{max}$ determined in sweep 1 and the value for G determined from the known lithological characteristics of the formation, according to Table I, as represented by block 62. Next, one level of data, $R_t$, $\phi$, $V_{sh}$ and $\rho_{gcn}$ is read, block 64. If $\rho_h$ is less than 1.0, which is determined by decision element 66, the value of $R_t$ is adjusted using equation 10, block 70. In either event, w is next computed using equation 9, as represented by block 72.

The program next determines if the formation is at an irreducible water saturation. This is the function of decision element 74. It has been found that if $(R_w/R_t)_{ave}$ is equal to or less than $(R_w/R_t)_{max}$, then the formation is at an irreducible water saturation and the value of $R_t$ equals $R_{tirr}$ and the value of w computed in block 72 is accurate. Therefore, if the answer from decision element 74 is YES, no correction for irreducible water saturation is required and the program next tests to determine whether the shale content of the formation must be considered. To this end, decision element 76 asks whether the formation contains shale, i.e., whether $V_{sh}$ is greater than 0.0%. If the answer is YES, $S_w$ is computed using equations 13 and 19–23, block 78, while if the answer is NO, $S_w$ is computed using equation 7, block 80. In this case, $S_{wirr}$ in equation 7 is representative of the value of $S_w$.

Returning now to decision element 74, if the formation is not at a reducible water saturation, NO answer, $(\phi S_{wirr})^w$ and $R_w/R_{tirr}$ are computed from equation 11 and $\phi S_{wirr}$ is also determined, block 82. Again it is determined whether the shale content of the formation must be considered. Decision element 84 asks if $V_{sh}$ is greater than 0.0% and if it is, YES answer, $R_w/R_t$ is corrected, block 86 by using equation 12 and the value of $(\phi S_{wirr})^w = R_w/R_{tirr}$ computed in block 82. Equation 9 is next used to compute w, block 88 and $S_w$ is computed using equations 13 and 19–23, block 90. If there is no shale in the formation, NO answer from decision element 84, w is computed, block 92 using equation 9 and $(R_w/R_{tirr})$ from block 82, and $S_w$ computed using equation 7, block 94.

Next, block 96 is entered via either block 90, 94, 78 or 80 and the value of permeability, k, is computed using equation 18 and the computed values of w and $(R_w/R_{tirr})$. If this is not the last depth level, NO answer from decision element 98, the depth level is incremented, block 100 and the program returns to block 64 for analysis of the next depth level. When all the depth levels of interest are analyzed, YES answer from decision element 98, values of w, k and $S_w$ are printed out, block 102 and if a log is required, YES answer from decision element 104, a continuous log of the values as a function of depth is produced, block 106 after which the program exits, block 108. Of course, it is understood that the formation may be divided into a number of intervals in which case $(R_w/R_t)_{ave}$ and $(R_w/R_t)_{max}$ are determined for each interval and used in conjunction with the data values for that interval to determine w, k and $S_w$.

Figure 5:
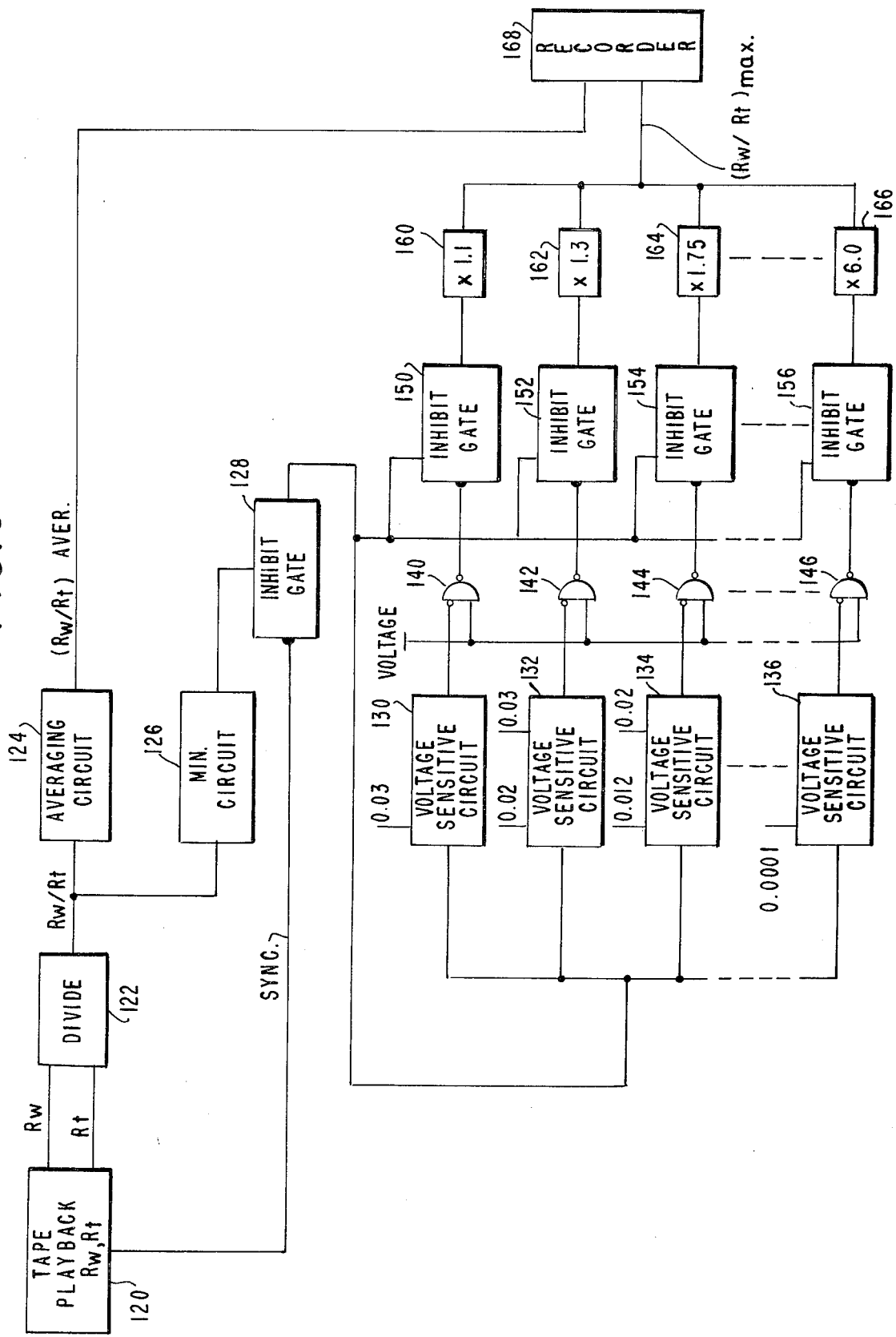
Figure 6B:
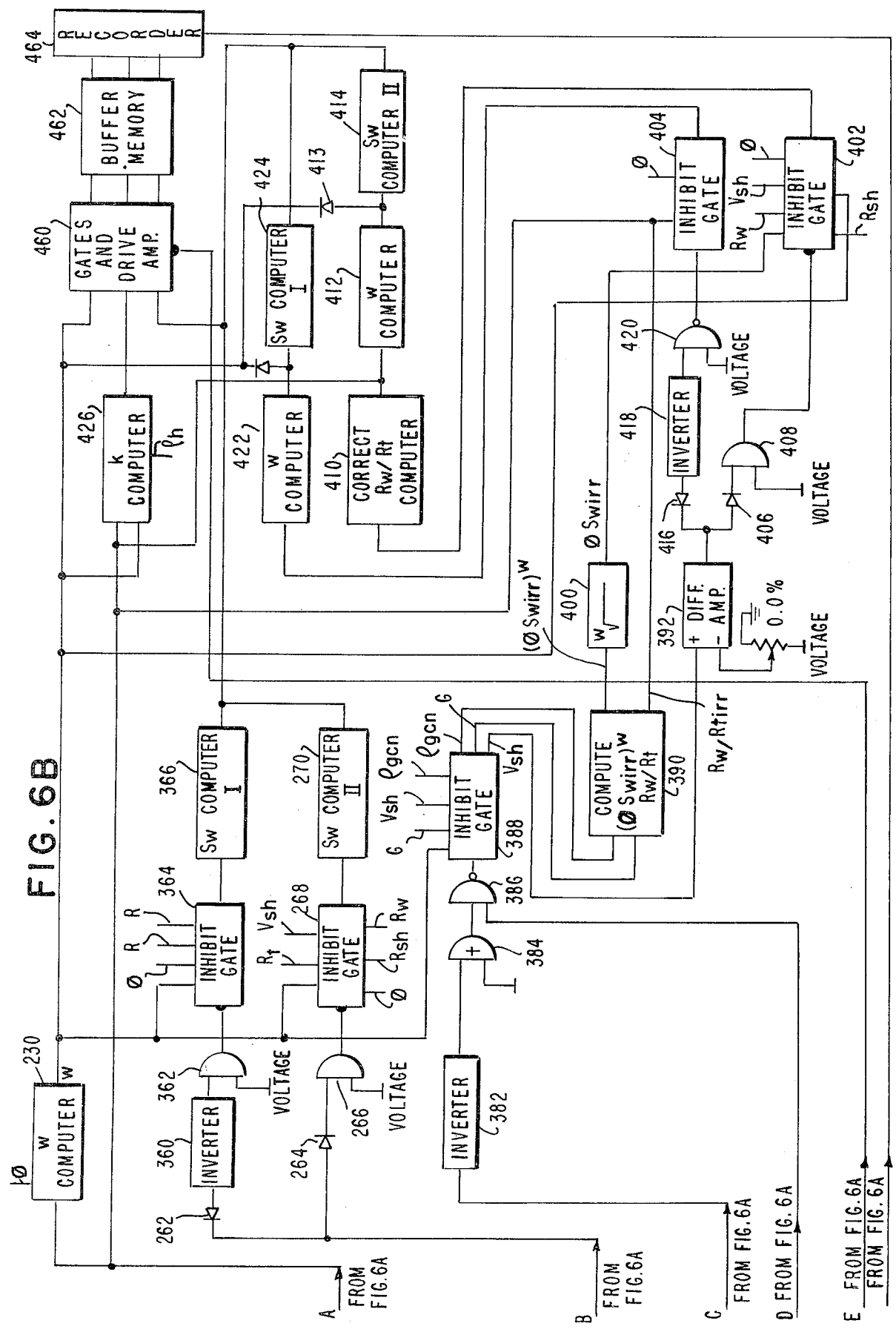

Referring now to FIGS. 5 and 6, there is shown a system for carrying out this invention using a special purpose analog computer. The system is divided into two subsystems, the first of which, shown in FIG. 5, is used to determine the average and minimum values of $R_w/R_t$. In the second subsystem, shown in FIG. 6, these values, together with other well logging data are used to determine values for permeability, water saturation and the parameter w.

Referring first to FIG. 5, a tape recorder playback identified by reference numeral 120 is arranged to play back a magnetic tape having recorded thereon values for $R_w$ and $R_t$ versus depth for the formation interval under investigation. Each set of values for $R_w$ and $R_t$ at each depth level are applied to divide circuit 122 and the result $R_w/R_t$ applied to conventional averaging and minimizing circuits 124 and 126 respectively. The output of the averaging circuit $(R_w/R_t)_{ave}$ which is a signal representative of the average value of this quantity over the formation interval. The output of the minimizing circuit is the minimum value of $R_w/R_t$. Since the minimum value for the entire interval is desired, the output of the minimizing circuit is applied to the input of inhibit gate 128 which will not produce an output signal until a synch signal from the tape playback is applied indicating that all the depth levels in the formation interval have been investigated.

The minimum value of $R_w/R_t$ from the inhibit gate is applied to a parallel set of voltage sensitive triggers 130–136, each of which will produce an output signal when the input voltage is within its sensitivity range. For example, circuit 130 will produce an output when the input voltage is greater than 0.03 volts and circuit 132 will produce an output when the input range is between 0.02–0.03. The output of each voltage sensitive circuit is applied to a NAND gate, 140–146 whose other input is a reference voltage. The output of the NAND gates are applied to inhibit gates 150–156 and serves to inhibit the operation of these gates until there are two voltage inputs to a particular NAND gate. Thus, if $R_w/R_{t(min)}$ exceeds 0.03 volts, there is an output from voltage sensitive circuit 130 which causes the output of NAND gate 140 to switch from high to low. The minimum value of $R_w/R_t$ coupled from inhibit gate 128 to the inputs of inhibit gates 150–156 is now applied to the times 1.1 multiply circuit 160 to obtain $(R_w/R_t)_{max}$ in accordance with Table III. Since the output of all other NAND gates are high, because the outputs of all the other voltage sensitive circuits are low, inhibit gates 152–156 do not produce an output signal. When $(R_w/R_t)_{min}$ falls within other voltage ranges, the operation of voltage sensitive circuits 132–136, NAND gates 142–146 and inhibit gates 152–156 and multiplying circuits 162–166 produce values of $(R_w/R_t)_{max}$ in accordance with Table III. It will be appreciated, that the dotted lines represent other voltage sensitive circuits, NAND gates and inhibit gates which are part of the overall circuit to produce the values in accordance with Table III but have been omitted from the drawing for simplicity and clarity. The values of $(R_w/R_t)_{ave}$ and $(R_w/R_t)_{max}$ are recorded on recorder 168 for subsequent use.

Referring now to FIG. 6, a circuit is shown for utilizing the values of $(R_w/R_t)_{ave}$, $(R_w/R_t)_{max}$, G, $R_t$, $\phi$, $V_{sh}$, $\rho_{gcn}$, $R_{sh}$, $R_w$ and $\rho_h$ to compute permeability, k, water saturation $S_w$ and the new parameter w. As indicated, the well logging measurements and input values are pre-recorded on magnetic tape for playback on tape playback 180. The tape recorder is of conventional design and arranged to provide synchronizing signals to timing circuit 182 for controlling the operation of the circuit.

At the start of the processing, the tape playback is begun and a signal representative of the magnitude of the hydrocarbon density, $\rho_h$ is applied to a differential amplifier 184 whose other input is a voltage representative of a value of $\rho_h$ equal to 1.0. If $\rho_h$ is less than 1.0, there is an output from the differential amplifier which is coupled to the voltage sensitive circuit 186 which in turn produces an output voltage coupled to one input of NAND gate 188. Since the other input to the NAND gate comes from timing circuit 182, the output of the NAND gate is high until it receives a signal from T1 of the timing circuit, and inhibits the operation of gate 192. At time T1, a signal is applied from timing circuit 182 to the other input of the NAND gate and if voltage is present on both inputs of the NAND gate, the output of the NAND gate switches to low and no longer inhibits the operation of the inhibit gate 192. Thus, if $\rho_h$ is less than 1.0, the inhibit gate applies a signal representative of the value of $\rho_h$ to the input of the ADJUST $R_t$ COMPUTER, indicated by block 194, which adjusts $R_t$ in accordance with equation 10.

The ADJUST $R_t$ COMPUTER is shown in greater detail in FIG. 7. As shown therein, $\rho_h$ is applied to a multiply circuit 200 where it is multiplied by 1.55 and the product applied to addition circuit 202 where 0.077 is added. The value of $\rho_h$ is also applied to squaring circuit 204 and then to multiply circuit 206 where $\rho_h^2$ is multiplied by 0.627. The quantity of 0.627 $\rho_h^2$ is subtracted from the quantity $(0.077 + 1.55 \rho_h)$ in substraction circuit 208. The output of the subtraction circuit is applied to multiply circuit 210 where it is multiplied by $R_t$ derived from the well logging measurements to produce a corrected value for $R_t$.

Referring back to FIG. 6, the output of the CORRECT $R_t$ COMPUTER is applied to sample and hold circuit 220. If $\rho_h$ is equal to or greater than 1.0, the output of differential amplifier 184 is zero and the input to NAND gate 188 from the voltage control circuit 186 is low. Under these conditions, the inhibit gate 192 is inhibited from operation when the timing signal T1 is applied to NAND gate 188 and the output from the CORRECT $R_t$ COMPUTER 194 is equal to zero.

A signal representative of the value of $R_t$ is also applied to sample and hold circuit 222 and a time T2, a signal from the timing circuit causes an output from the sample and hold circuits 220 and 222 to be applied to AND gate 224, which controls a voltage control switch 226. The other inputs to the voltage control switch 226 are the values of $R_t$ from the sample and hold circuits 220 and 222 representative respectively of the adjusted value and measured value of $R_t$. If $\rho_h$ is less than 1.0, there will be two inputs to the AND gate and the output will be high. In this condition the output of the voltage control switch 226 is controlled to provide, at the output thereof, the adjusted value of $R_t$ from sample and hold circuit 220, while if $\rho_h$ is equal to or greater than 1.0, the output of sample and hold circuit 220 will be zero and the output of AND gate 224 is low. In this condition, the output of switch 226 is controlled so as to provide a value of $R_t$ from the log measurement derived from sample and hold circuit 222. The output of switch 226 is applied to divide circuit 228 along with the value of $R_w$ for that depth level to provide a signal representative of $R_w/R_t$. The quantity $R_w/R_t$ is applied to the w COMPUTER, block 230 where the value of w is computed in accordance with equation 9. This computer is shown in greater detail in FIG. 8.

Referring to FIG. 8, $R_w/R_t$ is coupled to logarithmic circuit 232, the value of 2.2 is added to the output of circuit 232 in addition circuit 234, and the quantity squared in squaring circuit 236. The output of circuit 236 is divided by 2 in divide circuit 238 and the quantity 3.75 added in addition circuit 240. A signal representative of the porosity, $\phi$, is substracted from this quantity in subtraction circuit 242, after which the square root is taken as represented by block 244 and the value of w obtained.

Returning to recorder 180, values for $(R_w/R_t)_{ave}$ and $(R_w/R_t)_{max}$ are applied respectively to sample and hold circuits 250 and 252 which produce an output at time T3, in response to a signal from timing circuit 182. The outputs from the sample and hold circuits are compared in differential amplifier 254 and if $(R_w/R_t)_{max}$ exceeds $(R_w/R_t)_{ave}$, a positive voltage is applied to one input of NAND gate 255 through diode 256. The other input to the NAND gate 255 is a voltage so that the output of the gate switches from high to low and applies a signal representative of $V_{sh}$ from the tape playback through inhibit gate 258 to differential amplifier 260. The other input to the differential amplifier is a signal representative of the value of $V_{sh}$ equal to 0.0%. The output of the differential amplifier 260 is applied to diodes 262 and 264. If the value of $V_{sh}$ exceeds 0.0%, the output from the differential amplifier 260 is positive and voltage is applied to both inputs of NAND gate 266 to switch the output of the gate from high to low allowing inhibit gate 268 to apply voltages representative of the values of w, $R_t$ and $V_{sh}$, $\phi$, $R_{sh}$ and $R_w$ to the $S_w$ COMPUTER II, represented by block 270.

Figure 9A:
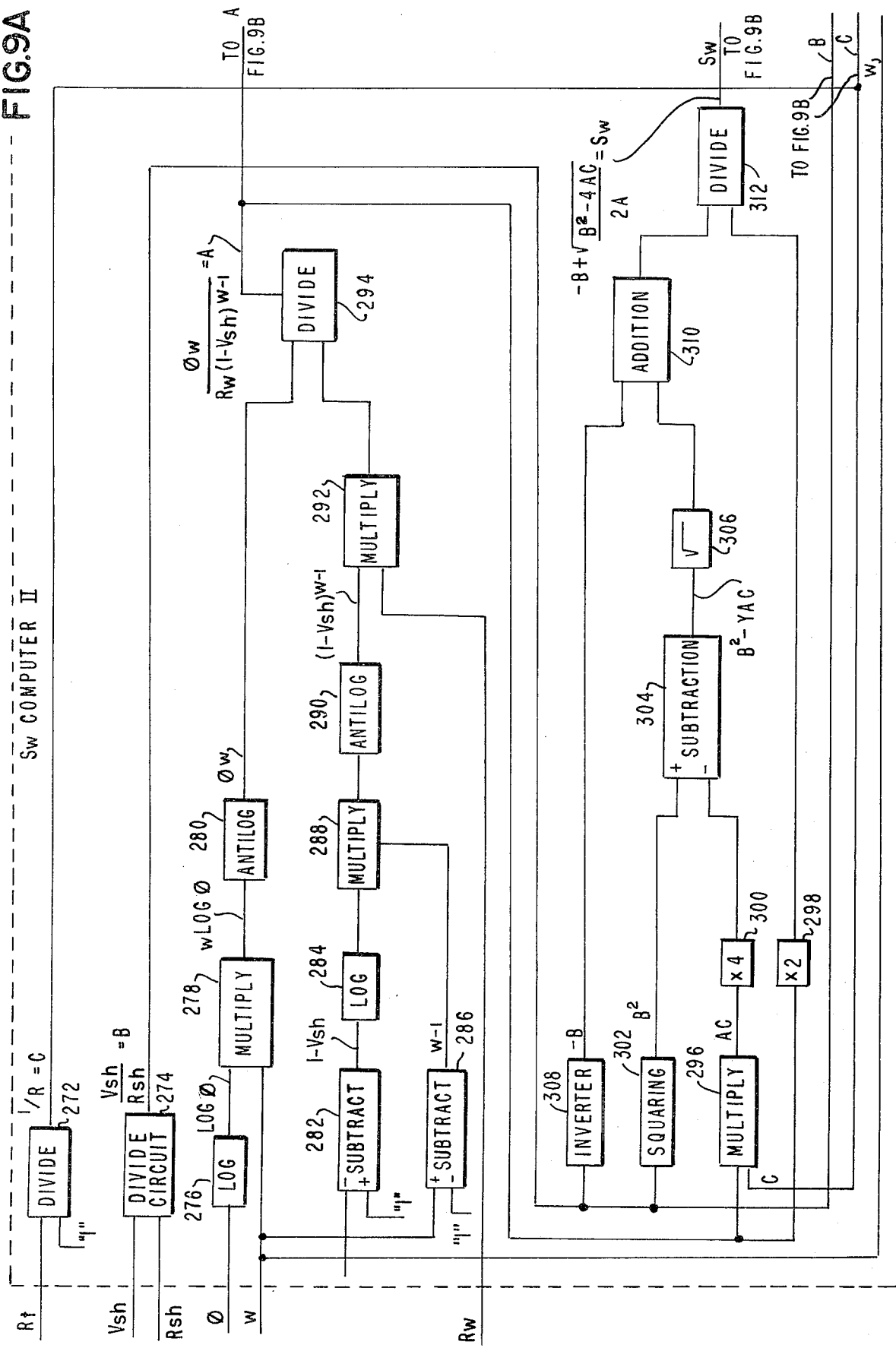
Figure 9B:
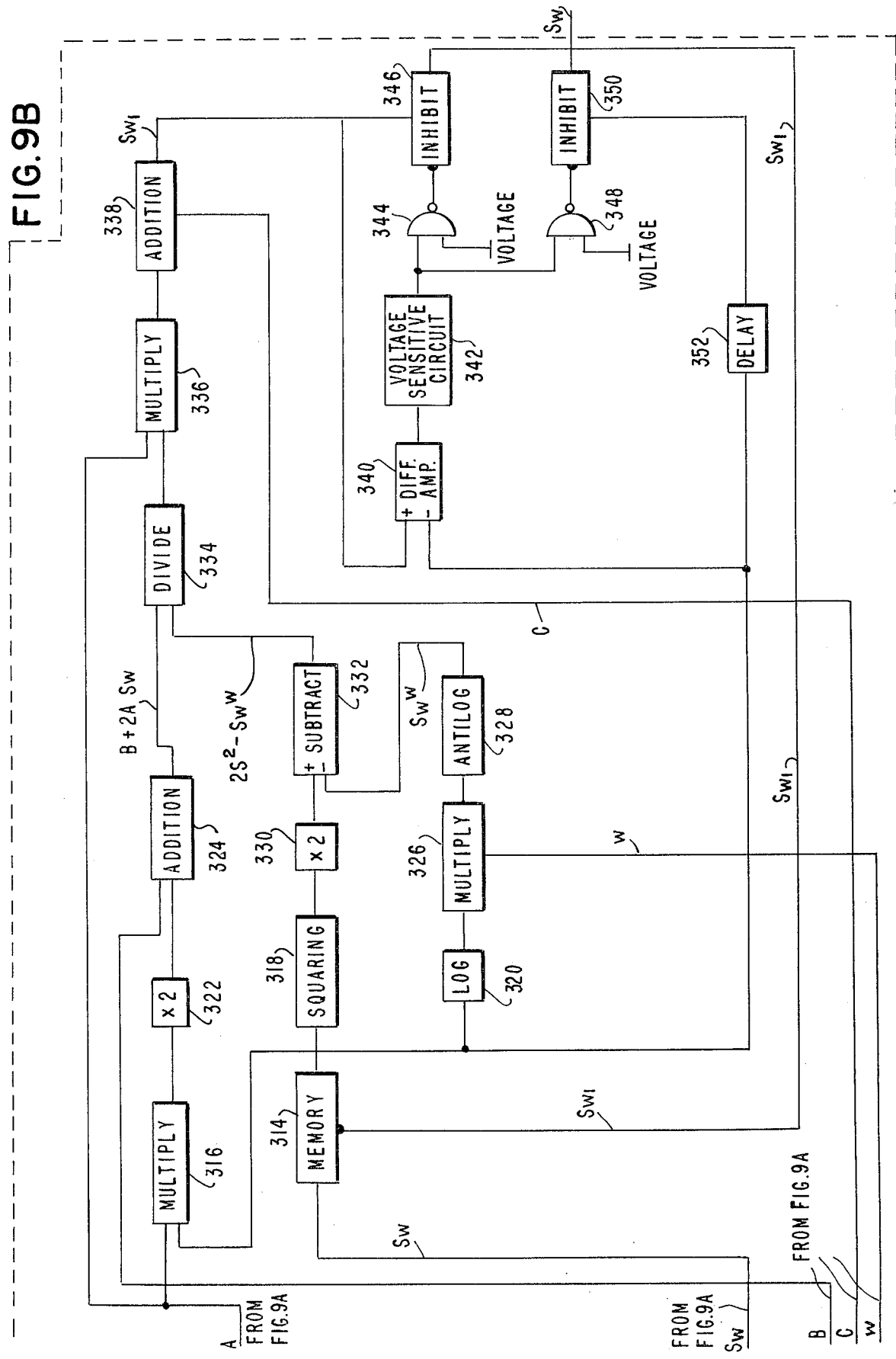

The computer for determining $S_w$ in accordance with equations 13 and 19 through 23 as represented by block 270 is shown in greater detail in FIG. 9. Referring to FIG. 9, $R_t$ is coupled to divide circuit 272 whose output is $1/R_t$ whose is equal to C, equation 22. $V_{sh}$ is divided by $R_{sh}$ in divide circuit 274; the output, $V_{sh}/R_{sh}$ being equal to B, equation 21. The log of $\phi$ is taken in logarithmic circuit 276 and the output of the circuit is multiplied by w in multiply circuit 278 afterwhich the anti-log is taken, circuit 280, to produce the quantity $\phi^w \cdot V_{sh}$ is subtracted from "1" in subtraction circuit 282 and the log of the quantity taken in circuit 284. "1" is subtracted from w in subtraction circuit 286 and the output of circuits 284 and 286 multiplied together in circuit 288. The output of multiply circuit 288 is applied to anti-log circuit 290 to produce the quantity $(1-V_{sh})^{w-1}$ which is multiplied by $R_w$ in multiply circuit 292. The output of circuit 280 is divided by the output of circuit 292 in divide circuit 294 to produce the quantity equal to A of equation 20.

A is multiplied by C in multiply circuit 296 and A is multiplied by 2 in multiply circuit 298. The output of circuit 296 is multiplied by 4, block 300. The value of B is squared in squaring circuit 302 and the output of circuit 300 equal to 4AC subtracted from $B^2$ in subtraction circuit 304 and the square root taken in circuit 306. The quantity B is inverted in inverter circuit 308 to produce $-B$, and added to the output of circuit 306 in addition circuit 310. This quantity is divided by 2A from circuit 298 in divide circuit 312 to produce a solution for $S_w$ for the quadratic equation 19. If the value of $V_{sh}$ is less than 50%, this solution for $S_w$ would be accurate. However, it has been found that when the shale content exceeds 50%, the value of $S_w$ computed at this point may not be correct. To check the value of $S_w$ and to provide a more accurate value for this parameter, if required, is the function of the remainder of the computer.

The signal $S_w$ is stored in memory 314 and then read and applied to multiply circuit 316 where it is multiplied by A, and applied to squaring circuit 318 where it is squared, and applied to logarithmic circuit 320. The output of multiply circuit 316 is multiplied by 2, in multiply circuit 322 and added to B in addition circuit 324. The output of logarithmic circuit 320 is multiplied by w in multiplying circuit 326 and the anti-log taken in circuit 328 to produce the quantity $S_w{}^w$. The output of squaring circuit 318 is multiplied by 2, in multiply circuit 330 and $S_w{}^w$ is subtracted therefrom in subtraction circuit 332. The output of subtraction circuit 332 is divided by the output of addition circuit 324 in divide circuit 334. This quantity is multiplied by A in multiply circuit 336 and the value of C added in addition circuit 338 to produce a quantity equal to $S_w$ (equation 23). The value of $S_w$ thus obtained is compared with the previously computed value for $S_w$ in differential amplifier 340 and if the output of differential amplifier 340 exceeds 0.005 volts, the voltage sensitive circuit 324 produces an output which is applied to NAND gate 344. This changes the output state of the NAND gate causing the inhibit gate 346 to be no longer inhibited and the value of $S_w$ just computed is applied through the inhibit gate back to memory 314 where it is stored in place of the previous value of $S_w$. This new value of $S_w$, called $S_{w1}$ is now read and used to compute still another value of $S_w$ which will, as above, be compared with the previously computed value of $S_w$ until the two values of $S_w$ are within 0.005. When this occurs, there is no output from voltage control circuit 342 and the output of NAND gate 348 changes state to no longer inhibit the operation of inhibit gate 350. The previously computed value of $S_w$ is applied through a delay 352 and through inhibit gate 350 to the output of the computer to provide the value of $S_w$.

Returning now to differential amplifier 260 in FIG. 6, if $V_{sh}$ is less than 0.0%, the output from the amplifier is negative and a voltage appears at the input to inverter 360 which inverts the signal and produces a positive output at one input to NAND gate 362. Since both inputs to this NAND gate are now positive, the output switches from high to low and inhibit gate 364 applies signals representative of values of $\phi$, $R_w$, $R_t$ and w to the $S_w$ COMPUTER I, which computes $S_w$ in accordance with equation 7. This computer is shown in detail in FIG. 10.

Referring to FIG. 10, input signals representative of $R_w$ and $R_t$ are coupled to divide circuit 370. The logarithm of output is taken in log circuit 372 which is then divided by w in divide circuit 374. The output of divide circuit 374 is coupled to anti-log circuit 376 whose output represents $\sqrt[w]{R_w/R_t}$. This quantity is divided by $\phi$ in divide circuit 378 to produce $S_w$ in accordance with equation 7.

Returning now to FIG. 6 and the differential amplifier 254, if $(R_w/R_t)_{ave}$ exceeds $(R_w/R_t)_{max}$, the output of differential amplifier 254 is negative and this signal is applied through diode 380 to inverter 382. The inverted signal is applied to an input of AND gate 384 which causes the output to switch from low to high. This signal is applied to one input of NAND gate 386 which inhibits the operation of inhibit gate 388 until timing signal T4 is also present at the input to NAND gate 386. With both signals present, the output switches from high to low and w, G and $\rho_{gcn}$ are applied to the COMPUTE $(\phi S_{wirr})^w$ and $R_w/R_t$ COMPUTER, 390, and $V_{sh}$ is applied to differential amplifier 392.

The computer for computing $(\phi S_{wirr})^w$ and $R_w/R_{tirr}$ in accordance with equation 11 is shown in FIG. 11. Referring to FIG. 11, $\rho_{gcn}$ is applied to subtraction circuit 392 where the quantity representative of 2.6 is subtracted therefrom. This result is cubed in cubing circuit 394 and then multiplied by G in multiply circuit 396. The result is applied to divide circuit 398 together with a quantity representative of the value of $10^{-6}$ to produce the output, $(\phi S_{wirr})^w$ and $R_w/R_t$ in accordance with equation 11.

Returning now to FIG. 6, the $(\phi S_{wirr})^w$ output of computer 390 is applied to circuit 400 to take the w th root and produce the quantity $(\phi S_{wirr})$ which is applied to inhibit gate 402. The $R_w/R_t$ output of computer 390 is applied to inhibit gate 404. These gates are controlled by differential amplifier 392 whose input is a signal representative of $V_{sh}$ and a signal representative of $V_{sh}$ equal to 0.0%. If the output of differential amplifier 392 is positive, a voltage is applied through diode 406 to the input of NAND gate 408 to switch the output of the NAND gate to low which applies the inputs through inhibit gate 402 to the CORRECT $R_w/R_{tirr}$ COMPUTER 410 which corrects $R_w/R_{tirr}$ in accordance with equation 12. This computer is shown in greater detail in FIG. 12.

With reference to FIG. 12, $R_w$, $V_{sh}$, and $(\phi S_{wirr})$ are multiplied in multiply circuit 412 and $\phi$ and $R_{sh}$ multiplied in multiply circuit 414. The outputs of these circuits are divided in divide circuit 416. Subtraction circuit 418 subtracts the quantity representative of "1" from $V_{sh}$ and the log of that quantity determined by circuit 420. Subtraction circuit 422 subtracts w from "1" and this quantity is multiplied by log $(1-V_{sh})$ in multiply circuit 423. The anti-log is taken by circuit 424 to produce the output $(1-V_{sh})^{w-1}$. The quantity $(\phi S_{wirr})$ is raised to the w power in circuit 426 and the output of circuit 426 divided by the output of circuit 424 in divided circuit 428. The output of circuit 428 is added to the output of divide circuit 416 in addition circuit 430 to produce an output representative of a corrected value for $R_w/R_t$.

Referring again to FIG. 6, the output of computer 410 is applied to w COMPUTER 412 and w is computed in accordance with equation 9 and the computer shown in detail in FIG. 8. The output of this computer is applied to the $S_w$ COMPUTER II, 414 which computes $S_w$ in accordance with equations 13, 19-23 using the circuits shown in detail in FIG. 9.

Returning now to the differential amplifier 392, if $V_{sh}$ is 0.0%, the output is negative and this signal is applied through diode 416 and inverter 418 to the input of NAND gate 420, thereby switching the output to low which applies $\phi$ and $R_w/R_t$ to the input of the w COMPUTER 422 to compute w in accordance with equation 9 and FIG. 8 and then to the $S_w$ COMPUTER I, 424 to compute $S_w$ in accordance with equation 7 and the computer shown in FIG. 10.

The output of one of the w COMPUTERS, either 230, 412 or 422 is applied to one input of k COMPUTER, block 426 which is arranged to compute the permeability in accordance with equation 18. The outputs of computers 412 and 422 are applied through diodes 413 and 423 respectively to prevent the output signals from these computers from being applied to the improper $S_w$ COMPUTER, either 424 or 414. Another input to the permeability computer is the value of $R_w/R_{tirr}$ computed by computers 410 or 390, or by divide circuit 228. The k COMPUTER is shown in greater detail in FIG. 13.

Referring now to FIG. 13, w is raised to the fourth power in circuit 430 and this quantity multiplied by $R_w/R_w$ in multiply circuit 432. $\rho_h$ is multiplied by 1.55 in multiply circuit 434 and also squared in squaring circuit 436. The output of squaring circuit 436 is multiplied by 0.629 in multiply circuit 438 and the output of multiply circuit 434 is added to 0.077 in addition circuit 440. The output of circuits 438 and 440 are subtracted in circuit 442 and the output of that circuit multiplied by a constant equal to C' in multiply circuit 444. The outputs of circuits 432 and 444 are applied to divide circuits 446 and the square root of the output circuit 446 taken in circuit 448 to produce a signal representative of the permeability, k.

Returning to FIG. 6, the computed values of permeability, $S_w$ and w are applied to gate and drive amplifier circuits 460. Upon generation of a suitable timing signal, T5, from timing circuit 182, gates 460 are opened to energize the drive amplifiers for application of the various signals to buffer memory 462. This buffer memory can take the form of a plurality of parallel capacitors and suitable high impedence output amplifiers for driving a recorder 464. The recording medium of recorder 464 is driven in synchronization with the tape recorder by using a sync signal produced from the tape recorder and produces logs of the various computed parameters.

While there has been described what are at present considered to be preferred embodiments of this invention, it will be obvious to those skilled in the art that various changes and modifications may be made therein without departing from the invention, and it is therefore intended to cover all such changes and modifications as to fall within the spirit and scope of the invention.

What I claim is:

1. A method of machine processing well logging data to determine characteristics of subsurface earth formations, comprising:
   (a) deriving a plurality of well logging measurements representative of various characteristics of subsurface earth formations;
   (b) combining said measurements to produce parameters functionally related to the water resistivity, formation resistivity and the formation porosity;
   (c) combining said parameters to produce a lithological parameter functionally related to the formation porosity and ratio of water resistivity to formation resistivity;
   (d) determining whether said formation is at irreducible water saturation;
   (e) determining, if the formation is at a reducible water saturation, whether there is shale present in the formation; and
   (f) combining, if there is no shale present in the formation, said lithological parameter with the parameters functionally related to the water resistivity, formation resistivity and formation porosity to obtain a parameter related to the water saturation in the formation.

2. The method of claim 1 wherein the step of determining whether the formation is at irreducible water saturation includes the steps of obtaining an average value of the ratio of water resistivity to formation resistivity for a borehole interval, obtaining from said average value a maximum value of the ratio of water resistivity to formation resistivity and comparing said average value to said maximum value.

3. The method of claim 1 wherein the step of determining whether there is shale present in the formation includes the step of comparing the amount of shale in the formation with a predetermined limit value.

4. A method of machine processing well logging data to determine characteristics of subsurface earth formations, comprising:
   (a) deriving a plurality of well logging measurements representative of various characteristics of subsurface earth formations;
   (b) combining said measurements to produce parameters functionally related to the water resistivity, formation resistivity and the formation porosity;
   (c) combining said parameters to produce a lithological parameter functionally related to the formation porosity and ratio of water resistivity to formation resistivity;
   (d) determining whether said formation is at irreducible water saturation;
   (e) determining, if the formation is at a reducible water saturation, whether there is shale present in the formation; and
   (f) combining, if there is shale present in the formation, said lithological parameter with the parameters functionally related to the porosity, formation resistivity, water resistivity and amount of shale in the formation to produce a parameter related to the water saturation of the formation.

5. The method of claim 4 wherein the step of producing an output parameter functionally related to the water saturation of the formation includes the step of comparing the parameter related to the water saturation in the formation with a limit value and if out of limits utilizing said parameter related to the water saturation in the formation to compute another parameter functionally related to the water saturation of the formation and repeating until the newly computed value related to the water saturation in the formation is within the limit value.

6. The method of claim 5 wherein said limit value is based upon a predetermined deviation from the previously computed value of the parameter related to the water saturation in the formation.

7. A method of machine processing well logging data to determine characteristics of subsurface earth formations, comprising:
   (a) deriving a plurality of well logging measurements representative of various characteristics of subsurface earth formations;
   (b) combining said measurements to produce parameters functionally related to the water resistivity, formation resistivity, formation porosity and hydrocarbon density of the formation;
   (c) determining whether relatively light hydrocarbons are present in the formation;
   (d) correcting the parameter functionally related to the formation resistivity if light hydrocarbons are present;
   (e) computing a lithological parameter by combining the parameters functionally related to the formation porosity, water resistivity and formation resistivity; and (f) combining said lithological parameter with the parameters functionally related to hydrocarbon density, formation resistivity and water resistivity to determine a parameter functionally related to the permeability of the formation.

8. Apparatus for processing well logging data to determine characteristics of subsurface earth formations, comprising:
   (a) means for deriving a plurality of well logging measurements representative of various characteristics of subsurface earth formations;
   (b) means for combining said measurements to produce parameters functionally related to the water resistivity, formation resistivity and the formation porosity;
   (c) means for combining said parameters to produce a lithological parameter functionally related to the formation porosity and ratio of water resistivity to formation resistivity;
   (d) means for determining whether said formation is at irreducible water saturation;
   (e) means for determining, if the formation is at a reducible water saturation, whether there is shale present in the formation; and
   (f) means for combining, if there is no shale present in the formation, said lithological parameter with the parameters functionally related to the water resistivity, formation resistivity and formation porosity to obtain a parameter related to the water saturation in the formation.

9. The apparatus of claim 8 wherein the means for determining whether the formation is at irreducible water saturation includes means for obtaining an average value of the ratio of water resistivity to formation resistivity for a borehole interval, means for obtaining from said average value a maximum value of the ratio of water resistivity to formation resistivity and means for comparing said average value to said maximum value.

10. The apparatus of claim 8 wherein the means for determining whether there is shale present in the formation includes means for comparing the amount of shale in the formation with a predetermined limit value.

11. Apparatus for processing well logging data to determine characteristics of subsurface earth formations, comprising:
   (a) means for deriving a plurality of well logging measurements representative of various characteristics of subsurface earth formations;
   (b) means for combining said measurements to produce parameters functionally related to the water resistivity, formation resistivity and the formation porosity;
   (c) means for combining said parameters to produce a lithological parameter functionally related to the formation porosity and ratio of water resistivity to formation resistivity;
   (d) means for determining whether said formation is at irreducible water saturation;
   (e) means for determining, if the formation is at irreducible water saturation, whether there is shale present in the formation; and
   (f) means for combining, if there is shale present in the formation, said lithological parameter with the parameters functionally related to the porosity, formation resistivity, water resistivity and amount of shale in the formation to produce a parameter related to the water saturation of the formation.

12. The apparatus of claim 11 wherein the means for producing an output parameter functionally related to the water saturation of the formation includes means for comparing the parameter related to the water saturation in the formation with a limit value and if out of limits utilizing said parameter related to the water saturation in the formation to compute another parameter functionally related to the water saturation of the formation and repeating until the newly computed value related to the water saturation in the formation is within the limit value.

13. The apparatus of claim 12 wherein said limit value is based upon a predetermined deviation from the previously computed value of the parameter related to the water saturation in the formation.

14. Apparatus for processing well logging data to determine characteristics of subsurface earth formations, comprising:
   (a) means for deriving a plurality of well logging measurements representative of various characteristics of subsurface earth formations;
   (b) means for combining said measurements to produce parameters functionally related to the water resistivity, formation resistivity, formation porosity and hydrocarbon density of the formation;
   (c) means for determining whether relatively light hydrocarbons are present in the formation;
   (d) means for correcting the parameter functionally related to the formation resistivity if light hydrocarbons are present;
   (e) means for computing a lithological parameter by combining the parameters functionally related to the formation porosity, water resistivity and formation resistivity; and
   (f) means for combining said lithological parameter with the parameters functionally related to hydrocarbon density, formation resistivity and water resistivity to determine a parameter functionally related to the permeability of the formation.

15. A method of machine processing well logging data to determine characteristics of subsurface earth formations, comprising the steps of:
   (a) deriving a plurality of well logging measurements representative of various characteristics of subsurface earth formations;
   (b) combining said measurements to produce parameters functionally related to the water resistivity, formation resistivity, the formation porosity and hydrocarbon density of the formation;
   (c) comparing the hydrocarbon density of the formation with a preselected value of hydrocarbon density and correcting the parameter functionally related to formation resistivity if the hydrocarbon density is not approximately equal to the preselected value; and
   (d) combining said parameters related to water resistivity, formation resistivity and formation porosity to produce a lithological parameter functionally related to the formation porosity and ratio of water resistivity to formation resistivity.

16. An apparatus for processing well logging data to determine characteristics of subsurface earth formations, comprising:
   (a) means for deriving a plurality of well logging measurements representative of various characteristics of subsurface earth formations;
   (b) means for combining said measurements to produce parameters functionally related to the water resistivity, the formation resistivity, the formation porosity and the hydrocarbon density of the formation;

(c) means for comparing the hydrocarbon density of the formation with a preselected value of hydrocarbon density, and means for correcting the parameter functionally related to formation resistivity if the hydrocarbon density is not approximately equal to the preselected value; and (d) means for combining said parameters related to water resistivity, formation resistivity and formation porosity to produce a lithological parameter functionally related to the formation porosity and ratio of water resistivity to formation resistivity.

* * * * *

UNITED STATES PATENT AND TRADEMARK OFFICE
CERTIFICATE OF CORRECTION

PATENT NO. : 4,245,313

DATED : January 13, 1981

INVENTOR(S) : George R. Coates

It is certified that error appears in the above—identified patent and that said Letters Patent is hereby corrected as shown below:

Col. 18, line 26, delete the words "a reducible" and insert the word --irreducible--.

Col. 19, lines 22 and 23, delete the words "a reducible" and insert the word --irreducible--.

Col. 7, line 13, delete the word "if" and insert the word --If--.

Col. 8, line 14, delete "12" and insert --13--.

Col. 8, line 40, in the numerator on the right side of equation 23, delete the term "$2Sw_1$" and insert the term --$2Sw_1^2$--.

Col. 9, line 3, in the denominator of equation 15, delete the term "$W^4$" and insert the term --$w^4$--.

Col. 9, line 10, in the denominator of equation 16, delete the term "$W^4$" and insert the term --$w^4$--.

Col. 9, line 28, in the numerator on the right side of equation 18, insert the term --$\phi^{2w}$--.

Col. 9, line 28, in the denominator on the right side of equation 18, delete the term "$W^4$" and insert the term --$w^4$--.

Col. 10, line 8, delete the words "a reducible" and insert the word --irreducible--.

Col. 10, line 10, delete the words "a reducible" and insert the word --irreducible--.

UNITED STATES PATENT AND TRADEMARK OFFICE
CERTIFICATE OF CORRECTION

PATENT NO. : 4,245,313

DATED : January 13, 1981

INVENTOR(S) : George R. Coates

It is certified that error appears in the above—identified patent and that said Letters Patent is hereby corrected as shown below:

Col. 11, line 39, delete the words "a reducible" and insert the word --irreducible--.

Col. 17, lines 15 through 18, delete the entire sentence "The output of circuit 438 and 440. . .and multiply circuit 444." and insert the following sentence --w is multiplied by 2 in multiply circuit 470 and the parameter $\phi$ is raised to the 2w power in circuit 472. The output of circuits 440 and 438 are subtracted in circuit 442 and the output of circuit 442 is multiplied by the constant equal to c' times the output of circuit 472 in multiply circuit 444.--

IN THE DRAWINGS:

Sheet 3, FIG. 4A, insert --YES-- between blocks 76 and 78.

Sheet 8, FIG. 7, insert --$\rho_h^2$-- between blocks 204 and 206.

Sheet 8, FIG. 8, change the equation between blocks 242 and 244 as follows:

$$3.75 - \phi + \frac{[\text{LOG } R_W/R_T + 2.2]^2}{2}$$

Sheet 8, FIG. 10, change the term between block 376 and block 378 to read: $w\sqrt{R_W/R_T}$ ; and the term after block 378 to read: $1/\phi \; w\sqrt{R_W/R_T}$ .

Sheet 9, FIG. 9A, change the term after block 280 from "$\phi_w$" to --$\phi^w$-- and the numerator in the equation after block 294 from "$\phi_w$" to --$\phi^w$--.

UNITED STATES PATENT AND TRADEMARK OFFICE
CERTIFICATE OF CORRECTION

PATENT NO. : 4,245,313

DATED : January 13, 1981

INVENTOR(S) : George R. Coates

It is certified that error appears in the above—identified patent and that said Letters Patent is hereby corrected as shown below:

Sheet 9, FIG. 9A, change the term between blocks 304 and 306 to read: $B^2-4AC$.

Sheet 9, FIG. 9A, change the equation after block 312 to read: $\dfrac{-B + \sqrt{B^2 - 4AC}}{2A} = S_w$.

Sheet 11, FIG. 13, change the term after block 448 to read: $--k^{1/2}--$.

Sheet 11, FIG. 13, between the input to block 430 and the input to block 444 insert the following:

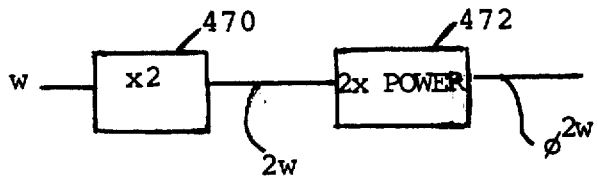

Signed and Sealed this

Sixteenth Day of June 1981

[SEAL]

Attest:

RENE D. TEGTMEYER

Attesting Officer — Acting Commissioner of Patents and Trademarks